US009139668B2

(12) United States Patent
Zipplies et al.

(10) Patent No.: US 9,139,668 B2
(45) Date of Patent: Sep. 22, 2015

(54) FLUOROPOLYMER COMPOSITIONS CONTAINING A POLYOL COMPOUND AND METHODS OF MAKING THEM

(75) Inventors: Tilman C. Zipplies, Burghausen (DE); Klaus Hintzer, Kastl (DE); Michael C. Dadalas, Eggenfelden (DE); Oliver Frey, Gauting (DE); Kai H Lochhaas, Neuotting (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 598 days.

(21) Appl. No.: 13/387,889

(22) PCT Filed: Jul. 30, 2010

(86) PCT No.: PCT/US2010/043805
§ 371 (c)(1),
(2), (4) Date: Jan. 30, 2012

(87) PCT Pub. No.: WO2011/014715
PCT Pub. Date: Feb. 3, 2011

(65) Prior Publication Data
US 2012/0129982 A1 May 24, 2012

(30) Foreign Application Priority Data

Jul. 31, 2009 (EP) .................................... 09166943
Dec. 22, 2009 (GB) ................................... 0922380.1

(51) Int. Cl.
| | | |
|---|---|---|
| C08F 14/18 | (2006.01) | |
| C08F 2/16 | (2006.01) | |
| C08L 5/00 | (2006.01) | |
| C08L 27/16 | (2006.01) | |
| C08L 27/18 | (2006.01) | |
| C08L 27/20 | (2006.01) | |
| C08K 5/053 | (2006.01) | |
| C08K 5/103 | (2006.01) | |
| C08K 5/151 | (2006.01) | |

(52) U.S. Cl.
CPC . *C08F 14/18* (2013.01); *C08F 2/16* (2013.01); *C08L 5/00* (2013.01); *C08L 27/16* (2013.01); *C08L 27/18* (2013.01); *C08L 27/20* (2013.01); *C08K 5/053* (2013.01); *C08K 5/103* (2013.01); *C08K 5/151* (2013.01)

(58) Field of Classification Search
CPC .............. C08F 14/18; C08F 2/16; C08L 5/00; C08L 27/18; C08L 2666/26; C08K 5/053; C08K 5/103; C08K 5/151
USPC .................................................. 524/58, 732
See application file for complete search history.

(56) References Cited

U.S. PATENT DOCUMENTS

| | | | |
|---|---|---|---|
| 3,037,953 A | 6/1962 | Kessler | |
| 3,489,595 A | 1/1970 | Brown, Jr. | |
| 4,369,266 A | 1/1983 | Kuhls | |
| 4,391,940 A | 7/1983 | Kuhls et al. | |
| 4,694,045 A | 9/1987 | Moore | |
| 4,789,715 A | 12/1988 | Bieringer et al. | |
| 5,453,477 A | 9/1995 | Oxenrider | |
| 5,576,381 A | 11/1996 | Bladel | |
| 5,674,959 A | 10/1997 | Arcella et al. | |
| 6,566,452 B1 | 5/2003 | Blaedel et al. | |
| 7,202,200 B1 * | 4/2007 | DeLeo et al. | ................. 510/191 |
| 7,560,506 B2 | 7/2009 | Kashiwagi | |
| 7,671,123 B2 | 3/2010 | Hoshikawa et al. | |
| 8,227,526 B2 | 7/2012 | Combes et al. | |
| 2006/0074178 A1 | 4/2006 | Auyeung et al. | |
| 2006/0281845 A1 | 12/2006 | Amin-Sanayei | |
| 2007/0149695 A1 | 6/2007 | Hintzer | |
| 2008/0178993 A1 | 7/2008 | Kelmartin | |

FOREIGN PATENT DOCUMENTS

| | | |
|---|---|---|
| DE | 2714593 | 10/1978 |
| DE | 202004020048 U1 | 4/2005 |
| EP | 0329154 | 8/1989 |
| EP | 0818506 | 1/1998 |
| EP | 0969055 | 1/2000 |
| EP | 1016466 | 7/2000 |
| EP | 1155055 | 4/2003 |
| EP | 1452571 | 9/2004 |
| EP | 1462461 A1 | 9/2004 |
| EP | 1526142 | 4/2005 |
| EP | 1533325 | 5/2005 |
| EP | 1538177 | 6/2005 |
| EP | 1193242 | 10/2005 |
| JP | S50-134089 A | 8/1977 |

(Continued)

OTHER PUBLICATIONS

"Modern Fluoropolymers", High Performance Polymers for Diverse Applications, John Scheirs, John Wiley & Sons, Wiley Series in Polymer Science, 1997.
"Fluoropolymers" Plastics Design Library, Sina Ebnesajjad, Norwich, NY, 2000.
Schick, M.J., "Nonionic Surfactants", Marcel Dekker, Inc., New York 1967.
Griffin, W. C., "Calculation of HLB Values of Non-Ionic Surfactants," Journal of the Society of Cosmetic Chemists 5, (1954) p. 259.

*Primary Examiner* — Angela C Scott
(74) *Attorney, Agent, or Firm* — C. Michael Geise

(57) ABSTRACT

There are provided compositions comprising (i) at least one non-aromatic polyol compound containing at least one polyol unit having at least two hydroxyl groups and at least one long chain unit containing at least 6 carbon atoms; and (ii) at least one fluoropolymer comprising repeating units derived from a fluorinated olefin. There are also provided methods of improving the shear stability of fluoropolymer dispersions, methods of coating substrates, and substrates coated with the above described composition.

11 Claims, No Drawings

(56) References Cited

FOREIGN PATENT DOCUMENTS

| | | |
|---|---|---|
| WO | WO 94/14904 A1 | 7/1994 |
| WO | WO 95/06681 A1 | 3/1995 |
| WO | WO 96/24622 A1 | 8/1996 |
| WO | WO 97/17381 A1 | 5/1997 |
| WO | WO 00/44576 A1 | 8/2000 |
| WO | WO 01/34670 A1 | 5/2001 |
| WO | WO 02/24828 A1 | 3/2002 |
| WO | WO 02/064696 A1 | 8/2002 |
| WO | WO 02/078862 A2 | 10/2002 |
| WO | WO 03/020836 A1 | 3/2003 |
| WO | WO 03/037623 A1 | 5/2003 |
| WO | WO 03/059992 A1 | 7/2003 |
| WO | WO 2004/078836 A1 | 9/2004 |
| WO | WO 2006/022122 A1 | 3/2006 |
| WO | WO 2006/069101 A1 | 6/2006 |
| WO | WO 2006/086793 A1 | 8/2006 |
| WO | WO 2006/086796 A1 | 8/2006 |
| WO | WO 2007/142888 A2 | 12/2007 |
| WO | WO 2008/033271 A2 | 3/2008 |
| WO | WO 2008/060463 A1 | 5/2008 |
| WO | WO 2009/116451 A1 | 9/2009 |

* cited by examiner

FLUOROPOLYMER COMPOSITIONS CONTAINING A POLYOL COMPOUND AND METHODS OF MAKING THEM

CROSS REFERENCE TO RELATED APPLICATIONS

This application is a national stage filing under 35 U.S.C. 371 of PCT/US2010/043805, filed 30 Jul. 2010, which claims priority to EPO Application No. 09166943.2, filed 31 Jul. 2009, and to GB Application No. 0922380.1, filed on 22 Dec. 2009, the disclosure of which is incorporated by reference in its/their entirety herein.

FIELD

The present disclosure relates to fluoropolymer dispersions containing a non aromatic polyol compound and their applications and to methods of making fluoropolymer dispersions with a non aromatic polyol compound.

BACKGROUND

Fluoropolymers have been long known and have been used in a variety of applications because of several desirable properties such as heat resistance, chemical resistance, weatherability, UV-stability, low friction and anti-stick properties, etc. The various fluoropolymers are described, for example in "Modern Fluoropolymers", edited by John Scheirs, Wiley Science 1997 or in "Fluoropolymers" edited by Sina Ebnesajjad, Plastics Design Library, Norwich, N.Y., 2000.

Commonly known or commercially employed fluoropolymers include polytetrafluoroethylene (PTFE), copolymers of tetrafluoroethylene (TFE) and hexafluoropropylene (HFP) (such copolymers are also referred to as FEP polymers), copolymers of tetrafluoroethylene and perfluoroalkoxy copolymers (such copolymers are also referred to as PFA), copolymers of ethylene and tetrafluoroethylene (such copolymers are also referred to as ETFE polymers), copolymers of tetrafluoroethylene, hexafluoropropylene and vinylidene fluoride (VDF) (such copolymers also referred to as THV) and polyvinylidene fluoride polymers (PVDF) and others.

Fluoropolymers have been used to improve the thermal and chemical resistance of a substrate or to provide anti stick or low friction properties to a substrate, for example by coating or impregnating the substrate with the fluoropolymers. The fluoropolymers may be applied to the substrate by liquid coating techniques if they are provided as a liquid formulation, such, as for example, as dispersions.

Fluoropolymer dispersions can be conveniently produced by aqueous emulsion polymerization employing fluorinated monomers, one or more radical reaction initiators and a suitable emulsifier. Perfluorinated alkanoic acids of the type $CF_3-(CF_2)_n-COO^-$ with n being an integer of 6 to 8, and in particular perfluorooctanoic acid (n=6) and its salts, have been the emulsifier of choice in the aqueous emulsion polymerization of fluoromonomers for the last decades. Using perfluorooctanoic acid increases the solid content (polymer content) of the dispersions and leads to the generation of polymers of desired molecular weight and particle size in acceptable reaction rates and to stable dispersions. However, perfluorinated emulsifiers are expensive materials. Some perfluorinated acids have also been found to be poorly biodegradable. Therefore, methods have been developed to retain and recycle the fluorinated emulsifiers from fluoropolymer dispersions leading to dispersion of low content of fluorinated emulsifiers.

Another attempt to reduce the amount of fluorinated emulsifiers in fluoropolymer dispersions involves preparing the fluoropolymers without using fluorinated emulsifiers. Therefore emulsion polymerization methods not requiring fluorinated emulsifiers at all have become of increased interest.

An aqueous emulsion polymerization without using any surfactants has been disclosed, for example, in U.S. Pat. No. 5,453,477, WO 96/24622 and WO 97/17381. For example, WO 97/17381 reports an aqueous emulsion polymerization in the absence of a surfactant wherein a radical initiator system of a reducing agent and oxidizing agent is used to initiate the polymerization and whereby the initiator system is added in one or more further charges during the polymerization.

Methods using non-fluorinated emulsifiers have also been described, for example in U.S. Patent Publ. No. 2006/0281845, in EP 1 462 461 or in WO 2008/033271. In WO 2008/033271 small particle dispersions of TFE, HFP and VDF copolymers with a major part of the polymer made up by TFE were obtained using a carbosilane as emulsifier. However, carbosilanes are not readily available and their use at present is not economical.

SUMMARY

It has now been found that the polyol surfactants provided herein can be used to prepare fluoropolymer dispersions.

It has also been found that the polyol surfactants provided herein can be used to increase the shear stability of fluoropolymer dispersions.

Therefore, in the following there is provided
a composition comprising
i) at least one non-aromatic polyol compound containing at least one polyol unit having at least two hydroxyl groups and at least one long chain unit containing at least 6 carbon atoms;
ii) at least one fluoropolymer comprising repeating units derived from a fluorinated olefin.

In another aspect there is provided a substrate containing a coating prepared from the composition above.

In a further aspect there is provided a method of increasing the shear stability of a fluoropolymer dispersion comprising adding to the dispersion an effective amount of at least one of the polyol compound to the dispersion.

In yet a further aspect there is provided a method of coating or impregnating a substrate comprising providing a fluoropolymer composition as above, optionally adding further components, and applying the composition to a substrate.

In yet a further embodiment there is provided a method of preparing a fluoropolymer comprising polymerising fluorinated olefins in an aqueous phase in the presence of the polyol described above.

DETAILED DESCRIPTION

Before any embodiments of this disclosure are explained in detail, it is to be understood that the disclosure is not limited in its application to the details set forth in the following description. The invention is capable of other embodiments and of being practiced or of being carried out in various ways.

Also, it is to be understood that the phraseology and terminology used herein is for the purpose of description and should not be regarded as limiting. The use of "including," "containing", "comprising," or "having" and is meant to be non-limiting and is meant to encompass the items listed thereafter (and equivalents thereof) as well as additional items. The word "consisting" is used to mean the items listed thereafter (and equivalents thereof) but not any additional items. The use of "a" or "an" is meant to encompass "one or more".

Any numerical range recited herein is intended to be an abbreviation and to explicitly include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Fluoropolymers:

Fluoropolymers may have a fully fluorinated backbone (i.e., they may be perfluoropolymers). The fluoropolymers may also have a partially fluorinated backbone, e.g. they may also contain hydrogen atoms in the backbone.

The fluoropolymers may be homopolymers or copolymers. The fluoropolymers contain repeating units derived from fluorinated olefins (also referred to as fluorinated olefinic monomers or fluoromonomers). Such fluorinated olefinic monomers include but are not limited to fluoroolefins, such as vinylidene fluoride (VDF), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE), vinyl fluoride (VF) and combinations thereof.

Fluoromonomers also include but are not limited to fluorine-containing vinyl ethers such as, for example, perfluoro(alkyl vinyl)ethers. Perfluoro(alkyl vinyl)ethers (PAVE) suitable for use as monomers include those of the formula:

$$CF_2=CFO(R'O)_n(R''O)_mRf \qquad (I)$$

where R' and R", are different linear or branched perfluoroalkylene groups of 2-6 carbon atoms, m and n are independently 0-10, wherein the sum of n+m may be 0 or at, least 1 and Rf is a perfluoroalkyl group of 1-6 carbon atoms.

Particular embodiments of perfluoro(alkyl vinyl)ethers include compositions of the formula:

$$CF_2=CFO(CF_2CFXO)_nRf \qquad (II)$$

where X is F or $CF_3$, n is 0-5, and Rf is a perfluoroalkyl group of 1-6 carbon atoms or wherein n is 0 or 1 and Rf contains 1-3 carbon atoms. Examples of such perfluorinated ethers include perfluoro(methyl vinyl)ether (PMVE) and perfluoro(propyl vinyl)ether (PPVE).

Other useful fluoromonomers include compounds of the formula:

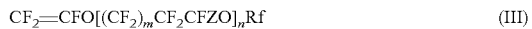

$$CF_2=CFO[(CF_2)_mCF_2CFZO]_nRf \qquad (III)$$

where Rf is a perfluoroalkyl group having 1-6 carbon atoms, m=0 or 1, n=0-5; and Z=F or $CF_3$. Specific members of this class are those in which Rf is $CF_3$, $C_2F_5$ or $C_3F_7$, m=0, and n=1.

Other examples of useful perfluoro(alkyl vinyl ethers) include compounds corresponding to the formula:

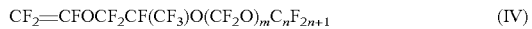

$$CF_2=CFOCF_2CF(CF_3)O(CF_2O)_mC_nF_{2n+1} \qquad (IV)$$

where n is an integer from 1 to 5, preferably 1, and m is an integer from 1 to 3.

Fluoromonomers also include, but are not limited to, fluorine-containing allyl ethers such as, for example, perfluoro(alkyl allyl)ethers. Perfluoro(alkyl allyl)ethers (PAAE) suitable for use as monomers include those of the formula:

$$CF_2=CFCF_2O(R'O)_n(R''O)_mRf \qquad (V)$$

where R' and R", are different linear or branched perfluoroalkylene groups of 2-6 carbon atoms, m and n are independently 0-10, wherein the sum of n+m is 0 or at least 1, and Rf is a perfluoroalkyl group of 1-6 carbon atoms.

The fluoropolymers may also contain units or repeating units derived from non-fluorinated monomers. Such co-monomers include alpha-olefins, for example ethylene and propylene. If copolymerized units of a hydrocarbon olefin are present in the fluoropolymers, the hydrocarbon olefin content is generally between about 4 to about 30 weight percent based on the total weight of the polymer.

Combinations of any of the above named fluoromonomers and combinations of above named fluoromonomers and hydrocarbon olefins can also be used.

The fluoropolymers may be thermoplastic fluoropolymers or fluoroelastomers. By "thermoplastic fluoropolymer" is meant a crystalline or semi-crystalline fluoropolymer. Crystalline or semi-crystalline fluoropolymers may typically have a sharp melting point (i.e. a melting point wherein the melting has occurred within a range covering less than 3° C.), or they may have a melting range. The melting point or range typically is between about 90° C. to about 350° C., or greater than 312° C. and up to about 350° C. or even greater than 326° C. an up to about 350° C. The melting points can be measured, for example, by DSC.

Thermoplastic fluoropolymers may be homopolymers (e.g. polytetrafluoroethylene homopolymers or polyvinylidene fluoride homopolymers). They may also be comonomers. Thermoplastic fluoropolymers include, but are not limited to PTFE (TFE homopolymers), "modified PTFE" (i.e., TFE-comonomers with a comonomer content of up to 1% wt), THV's (=polymers comprising repeating units derived from TFE, HFP and VDF), FEP's (=polymers comprising repeating units derived from TFE and FEP) and PFA's (=polymers comprising repeating units derived from TFE and perfluoroalkylvinyl ether or perfluoroalkylvinyl ether).

Thermoplastic fluoropolymers include "melt processable" and "non-melt processable" fluoropolymers. Non-melt processable fluoropolymers have such a high molecular weight or melt viscosity that they cannot be conveniently melt extruded. This property is expressed by the "melt flow index" or "MFI", which measures the amount of polymer that can be pressed through an aperture over a specified time and under a specified weight (compare DIN EN ISO 1133). An MFI at 372° C. using a 10 kg load (abbreviated as "MFI 372/10") of 0.1 g/10 min or less indicates that a polymer is non-melt processable. Melt-processable polymers have an MFI 372/10 of greater than 0.1 g/10 min. Examples of non-melt processable fluoropolymers include PTFE homopolymers and so-called "modified PTFEs" which are PTFE comonomers having a comonomer content of up to 1% by weight. Melt processable PTFE homopolymers are referred to as "micropowders". They have a low molecular weight such that the "micropowders" have an MFI 372/10 of greater than 0.1 g/10 min. PVDF, THV's, FEP's and PFAs are further but not the only examples of melt processable fluoropolymers.

By "fluoroelastomer" is meant an amorphous fluoropolymer that can be cured (cross-linked) to obtain elastomeric properties or an amorphous polymer that has elastomeric properties (and which typically is cross-linked). Amorphous fluoropolymers generally do not have a melting point or melting range. Fluoroelastomers may contain between 25 to 70 weight percent or 30 to 60 weight percent, based on the weight of the fluoroelastomer, of copolymerized units of a first fluoromonomer which may be vinylidene fluoride (VDF) or tetrafluoroethylene (TFE) or a PAVE or a combination thereof. The remaining units in the fluoroelastomers are comprised of one or more additional copolymerized monomers, different from said first monomer. Such monomers include the fluoromonomers described above, the hydrocarbon olefins described above and combinations thereof.

The fluoroelastomers may also include fluoropolymers containing units of one or more cure site monomers. Cure site monomers introduce into the fluoropolymer groups that are susceptible to cross-linking agents to form cross-linked polymer network. Therefore, fluoroelastomers include curable (cross-linkable) and cured (cross-linked) fluoropolymers.

Examples of suitable cure site monomers include, but are not limited to: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro(2-phenoxypropyl vinyl)ether; and ix) non-conjugated dienes.

Brominated cure site monomers may contain other halogens, preferably fluorine. Examples of brominated olefin cure site monomers are $CF_2=CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4-hexafluorobutene; 4-bromo-3-chloro-1,1,3,4,4-pentafluorobutene; 6-bromo-5,5,6,6-tetrafluorohexene; bromoperfluorobutene-1 and 3,3-difluoroallyl bromide. Suitable brominated vinyl ether cure site monomers include 2-bromo-perfluoroethyl perfluorovinyl ether and fluorinated compounds of the class $CF_2Br$—$Rf$—$O$—$CF=CF_2$ (Rf is a perfluoroalkylene group), such as $CF_2BrCF_2O$—$CF=CF_2$, and fluorovinyl ethers of the class $ROCF=CFBr$ or $ROCBr=CF_2$ (where R is a lower alkyl (C1-C6) group or fluoroalkyl group) such as $CH_3OCF=CFBr$ or $CF_3CH_2OCF=CFBr$.

Suitable iodinated cure site monomers include iodinated olefins of the formula: $CHR=CH$—$Z$—$CH_2CHR$—$I$, wherein R is —H or —$CH_3$; Z is a C1-C18 (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nO$—$CF=CF_2$ and $ICH_2CF_2O[CF(CF_3)CF_2O]_nCF=CF_2$, and the like, wherein n=1-3. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodo-perfluoroethyl perfluorovinyl ether are also useful cure site monomers.

Useful nitrile-containing cure site monomers include those of the formulae: $CF_2=CF$—$O(CF_2)_n$—$CN$ where n=2-12, preferably 2-6; $CF_2=CF$—$[CF_2$—$CF(CF_3)$—$O]_n$—$CF_2$—$CF(CF_3)$—$CN$ where n=0-4, preferably 0-2; $CF_2=CF$—$[OCF_2CF(CF_3)]_x$—$O$—$(CF_2)_n$—$CN$ where x=1-2, and n=1-4; and $CF_2=CF$—$O$—$(CF_2)_n$—$O$—$CF(CF_3)CN$ where n=2-4. Preferred cure site monomers are perfluorinated polyethers having a nitrile group and a trifluorovinyl ether group, such as, for example, $CF_2=CFOCF_2CF(CF_3)OCF_2CF_2CN$, (i.e., perfluoro(8-cyano-5-methyl-3,6-dioxa-1-octene) or 8-CNVE).

Examples of non-conjugated diene cure site monomers include, but are not limited to 1,4-pentadiene; 1,5-hexadiene; 1,7-octadiene; 3,3,4,4-tetrafluoro-1,5-hexadiene. A suitable triene is 8-methyl-4-ethylidene-1,7-octadiene.

Of the cure site monomers listed above, preferred compounds, for situations wherein the fluoroelastomer will be cured with a peroxide curing agent, include cure-site monomers containing one or more iodine and/or one or more bromine groups and cure site monomers containing one or more nitrile groups or a combination thereof.

Typical examples include 4-bromo-3,3,4,4-tetrafluorobutene-1 (BTFB); 4-iodo-3,3,4,4-tetrafluorobutene-1 (ITFB); allyl iodide; bromotrifluoroethylene, nitrile-containing cure site monomer such as 8-CNVE.

When the fluoroelastomer will be cured with a polyol as a curing agent, 2-HPFP or perfluoro(2-phenoxypropyl vinyl) ether may be used as the preferred cure site monomer.

When the fluoroelastomer will be cured with a tetraamine, bis(aminophenol) or bis(thioaminophenol), a nitrile-containing cure site monomer (e.g. 8-CNVE) may be used as a preferred cure site monomer.

When the fluoroelastomer will be cured with ammonia or a compound that releases ammonia at curing temperatures (e.g. urea), a nitrile-containing cure site monomer (e.g. 8-CNVE) is the preferred cure site monomer.

Units of cure site monomer, when present in the fluoroelastomers manufactured by the process of this invention, are typically present at a level of 0.05-10 wt. % (based on the total weight of fluoroelastomer), preferably 0.05-5 wt. % and most preferably between 0.05 and 3 wt. %. The optimum amounts depend on the curing agent, presence or absence of curing accelerators and curing regime used and can be determined by routine experimentation.

Specific fluoroelastomers include, but are not limited to those comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl)ether, tetrafluoroethylene and 4-bromo-3,3,4,4-tetrafluorobutene-1; vi) vinylidene fluoride, perfluoro(methyl vinyl)ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl)ether; xiii) tetrafluoroethylene, perfluoro(methyl vinyl)ether and perfluoro(8-cyano-5-methyl-3,6-dioxa-1-octene); xiv) tetrafluoroethylene, perfluoro(methyl vinyl)ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl)ether and perfluoro (2-phenoxypropyl vinyl)ether.

Additionally, iodine-containing endgroups, bromine-containing endgroups or mixtures thereof may optionally be present at one or both of the fluoroelastomer polymer chain ends as a result of the use of a functionalised chain transfer or molecular weight regulating agents during preparation of the fluoroelastomers. The amount of chain transfer agent, when employed, is calculated to result in an iodine or bromine level in the fluoroelastomer in the range of 0.005-5 wt. %, preferably 0.05-3 wt. %. Examples of functionalised chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others.

Cure site monomers and chain transfer agents may be added to the reactor neat or as solutions. In addition to being introduced into the reactor near the beginning of the polymerization, quantities of chain transfer agent may be added throughout the entire polymerization reaction period, depending upon the desired composition of the fluoroelastomer being produced, the chain transfer agent being employed, and the total reaction time.

Particular examples of fluoropolymers include:

(a) a polymer comprising repeating units derived from vinylidene fluoride and tetrafluoroethylene;
(b) a polymer comprising repeating units derived from vinylidene fluoride and hexafluoropropylene;
(c) a polymer comprising repeating units derived from vinylidene fluoride, tetrafluoroethylene, and hexafluoropropylene;
(d) a polymer comprising repeating units derived from vinylidene fluoride, tetrafluoroethylene, hexafluoropropylene, and a hydrocarbon alpha-olefin having from 2 to 9 carbon atoms;
(e) a polymer comprising repeating units derived from tetrafluoroethylene and a hydrocarbon alpha-olefin having from 2 to 9 carbon atoms;
(f) a copolymer of hexafluoropropylene and a hydrocarbon alpha-olefin having from 2 to 9 carbon atoms;
(g) a polymer comprising repeating units derived from tetrafluoroethylene, hexafluoropropylene, and a hydrocarbon alpha-olefin having from 2 to 9 carbon atoms;
(h) a polymer comprising repeating units derived from tetrafluoroethylene having a melt flow index at 372° C. of greater than 0.1 g/10 min at a load of 10 kg;
(i) a polymer comprising repeating units derived from tetrafluoroethylene having a melt flow index at 372° C. of 0.1 g/10 min or less than 0.1 g/10 min and
(j) PVDF;
(k) a polymer comprising repeating units derived from TFE and one or more perfluoroalkyl vinyl ether and/or perfluoroalkyl ally ether and optionally hexafluoropropylene;
(l) a polymer comprising repeating units derived from TFE, hexafluoropropylene and, optionally, one or more perfluoroalkyl vinyl ether and/or perfluoroalkyl ally ether; and
(m) a polymer comprising repeating units derived from TFE, hexafluoropropylene, ethylene and/or propylene and, optionally, one or more perfluoroalkyl vinyl ether and/or perfluoroalkyl ally ether.

Methods of Making Fluoropolymers Using Polyols

Polyols as described below may allow for the polymerization of fluorinated monomers with reduced amounts of fluorinated emulsifiers or even without using fluorinated emulsifiers. For instance, in yet further embodiments, the methods described herein may include polymerizing fluorinated monomers in an aqueous medium that contains less than 100 ppm of perfluorinated alkanoic carboxylates (in particular perfluorinated C-8 to C12 alkanoic acids, such as perfluorooctanoic acid). In other embodiments, the aqueous medium may contain less than 50 ppm, less than 10 ppm, or even 0 ppm of the fluorinated emulsifiers described above.

The polymerisation using the polyol compounds described herein also may allow for the preparation of fluoropolymer dispersions containing small particle sizes. Fluoropolymers having small particle sizes have been found to have good properties for coating or impregnation applications. Furthermore, dispersions containing small fluoropolymer particles tend to be more stable than dispersions with large fluoropolymer particles. The latter may lead to premature coagulation (i.e., irreversible phase separation) or settling out of the polymer from the aqueous phase (i.e., reversible phase separation). Both types of phase separation, even the reversible type, are undesired. Premature coagulation is to be avoided when providing fluoropolymer dispersions as a raw material. However, even if the final product is a solid obtained from fluoropolymer dispersions by coagulation, premature coagulation or settling out of the fluoropolymers is to be avoided because it reduces the shelf life of the dispersion or leads to disruptions in the polymer processing, work up and application steps.

The use of the polyols described herein has been found particularly suitable for the preparation of small particle size fluoropolymers, in particular for polymerisations with TFE, or a combination comprising TFE and HFP, TFE and VDF and TFE, VDF and HFP. A small amount of the polyol provided herein in the polymerization of fluorinated monomers may yield fluoropolymers having small particle sizes and may be used to produce fluoropolymer dispersions having a solid content of greater than 10% wt.

The polyols of the present invention may be present in very low amounts, especially compared to the amounts of fluorinated surfactant typically used in emulsion polymerization processes. For instance, they may be present in an amount of up to 1 weight percent, up to 0.5 weight percent, or even up to 0.1 weight percent based on the weight of the aqueous phase.

Furthermore, the polyols may be present in an amount of from 0.0001 weight percent, from 0.001 weight percent, from 0.01 weight percent, or even from 0.1 weight percent based on the weight of the aqueous phase. In this context the "weight of the aqueous phase" refers to the weight of the water used in the reaction medium. Optimum amounts may be identified by routine experimentation.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinoyl peroxide, dipropionylperoxide, dibutyrylperoxide, diglutaric acid peroxide, and further per-acids and salts thereof such as for example ammonium, sodium or potassium salts. Examples of per-acids include peracetic acid. Esters of the peracid can be used as well. Examples of inorganic initiators include for example ammonium-alkali- or earth alkali salts of persulfates, permanganic or manganic acid or manganic acids and combinations thereof.

A persulfate initiator, for example ammonium persulfate (APS), may be used alone or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (RONGALIT, available from BASF, Germany) or fluoroalkyl sulfinates. The reducing agent typically reduces the half-life time of the persulfate initiator. Additionally, a metal salt catalyst such as for example copper, iron or silver salts may be added. The amount of initiator may be from 0.0001% by weight (based on the fluoropolymer solids to be produced) to 1% by weight. In one embodiment, the amount of initiator is from 0.0005 to 0.5% by weight. In another embodiment, the amount may be from 0.005 to 0.3% by weight.

The aqueous emulsion polymerization system may further comprise other materials, such as buffers and, if desired, complex-formers or chain-transfer agents. When present, chain transfer agents are typically present in small amounts so as to control the chain lengths of the polymers. Examples of chain transfer agents that can be used include ethers, such as dimethyl ether, and methyl t-butyl ether; alkanes having 1 to 5 carbon atoms such as ethane, propane and n-pentane; halogenated hydrocarbons such as $CCl_4$, $CHCl_3$ and $CH_2Cl_2$ and hydrofluorocarbon compounds. Other suitable chain transfer agents include isopropanol, diethylmalonate, ethyl acetate, chloroform, acetone and dodecyl mercaptan, dialkyl ether.

The aqueous emulsion polymerization system may also contain further emulsifiers other than the polyols although this may not be necessary. Such emulsifiers include for example one or more fluorosurfactants that are not carboxylic acids, such as for example, sulfinates or perfluoroaliphatic sulfinates. The sulfinate may have a formula Rf—$SO_2M$, where Rf is a perfluoroalkyl group or a perfluoroalkoxy group. The sulfinate may also have the formula Rf'—($SO_2M)n$ where Rf' is a polyvalent, preferably divalent, perfluoro radical and n is an integer from 2-4, preferably 2. Preferably the perfluoro radical is a perfluoroalkylene radical. Generally Rf and Rf' have 1 to 20 carbon atoms, preferably 4 to 10 carbon atoms. M is a cation having a valence of 1 (e.g. H+, Na+, K+, $NH_4$+, etc.). Specific examples of such fluorosurfactants include, but are not limited to $C_4F_9$—$SO_2Na$; $C_6F_{13}$—$SO_2Na$; $C_8F_{17}$—$SO_2Na$; $C_6F_{12}$—$(SO_2Na)_2$; and $C_3F_7$—O—$CF_2CF_2$—$SO_2Na$.

Although not necessary, fluorinated emulsifiers such as fluorinated carboxylic acids, may also be used in the polymerisation, in particular those that have been found to be less bioaccumulating than perfluorinated alkanoic acids. Partially fluorinated or perfluorinated alkoxy acids or polyoxyalkanoic acids may be used if so desired. Such emulsifiers may be fluoropolyethers (FPE) having at least one endgroup selected from the group consisting of carboxylic acid, carboxylic acid salt, sulfonic acid and sulfonic acid salt. The fluoropolyethers can have any chain structure in which oxygen atoms in the backbone of the molecule are separated by saturated fluorocarbon groups having 1-3 carbon atoms. More than one type of fluorocarbon group may be present in the molecule. Representative structures have one or more units selected from (—CF($CF_3$)—$CF_2$—O—), (—$CF_2$—$CF_2$—O—), (—$CF_2$—O—), (—CFH—) or combinations thereof.

Fluoropolymer dispersions with a solids content (polymer content) of from 10 to 39% wt. may be prepared by the polymerisation methods provided herein (raw dispersions). For instance, the solids content may be up to 14%, up to 24%, or up to 31% wt. The dispersions may be upconcentrated to higher solid contents by known methods such as thermal upconcentration, ultrafiltration, phase separation and the like.

In further embodiments, the methods described herein may further comprise adding a non fluorinated anionic surfactant, a non fluorinated, non-ionic surfactant, or a combination thereof to the fluoropolymer dispersions produced by the above-described methods. These surfactants may further increase the stability of the dispersion, for example during or after upconcentration processes, or to increase the stability of the dispersion to shear forces but may also be added to fine-tune the wetting properties of the compositions, for example to facilitate coating or impregnating a substrate.

Anionic non-fluorinated surfactants that may be used in connection with this invention include surfactants that have an acid group, in particular a sulfonic or carboxylic acid group. Examples of non-fluorinated anionic surfactants include surfactants that have one or more anionic groups. Anionic non-fluorinated surfactants may include in addition to one or more anionic groups, other hydrophilic groups such as polyoxyalkylene groups having 2 to 4 carbons in the oxyalkylene group (for example, polyoxy ethylene groups). Typical non-fluorinated surfactants include anionic hydrocarbon surfactants. The term "anionic hydrocarbon surfactants" as used herein comprises surfactants that include one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero-atoms such as for example oxygen, nitrogen and sulfur.

Particular examples of non fluorinated, anionic hydrocarbon surfactants for use in this invention include alkyl sulfonates such as lauryl sulfonate, alkyl sulfates such as lauryl sulfate, alkylarylsulfonates and alkylarylsulfates, and alkylsulfosuccinates, fatty (carboxylic) acids and salts thereof such as lauric acids and salts thereof and phosphoric acid alkyl or alkylaryl esters and salts thereof. Commercially available anionic hydrocarbon surfactants that can be used include those available under the trade designation Polystep A1 6 (sodium dodecylbenzyl sulphonate) from Stepan Company, Germany; Hostapur SAS 30 (secondary alkyl sulphonate sodium salt), Emulsogen LS (sodium lauryl sulfate) and Emulsogen EPA 1954 (mixture of C2 to C4 sodium alkyl sulfates) each available from Clariant GmbH, Germany; Edenor C-12 (Laurie acid) available from Cognis, Germany; and TRITON X-200 (sodium alkylsulfonate) available from Dow Chemical, Midland, Mich. Further suitable anionic surfactants include the sulfosuccinates disclosed in EP 1538177 and EP 1526142. Preferred are non-fluorinated, anionic hydrocarbon surfactants having a carboxylic acid group.

Suitable non-fluorinated non-ionic surfactants include those described in "Nonionic Surfactants", M. J. Schick (ed.), Marcel Dekker, Inc., New York 1967. Examples of non-ionic surfactants can be selected from the group of alkylarylpolyethoxy alcohols, polyoxyalkylene alkyl ether surfactants, and alkoxylated acetylenic diols, preferably ethoxylated acetylenic diols, and mixtures of such surfactants. Other suitable non-fluorinated non-ionic surfactants include the polyol compounds described herein.

Typically, the non-ionic surfactant or non-ionic surfactant mixture used will have an HLB (hydrophilic lypophilic balance) between 11 and 16. The HLB number was introduced by W. C. Griffin "Calculation of HLB Values of Non-Ionic Surfactants," Journal of the Society of Cosmetic Chemists 5 (1954), p. 259 to characterize surfactants. The HLB number of non-ionic surfactants having only ethyleneoxide groups can be calculated according to the formula HLB=E/5 where E represents the weight % of ethyleneoxide groups. In particular embodiments, the non-ionic surfactant or mixture of non-ionic surfactants corresponds to the general formula (VI):

$$R_1O—[CH_2CH_2O]_n—[R_2O]_m—R_3 \quad (VI)$$

wherein $R_1$ represents a linear or branched aliphatic or aromatic hydrocarbon group having at least 8 carbon atoms, preferably 8 to 18 carbon atoms. Therefore, in a preferred embodiment, the residue $R_1$ corresponds to a residue (R')(R")C— wherein R' and R" are the same or different, linear, branched or cyclic alkyl groups. In formula (X) above $R_2$ represents an alkylene having 3 carbon atoms, $R_2$ represents hydrogen or a C1-C3 alkyl group, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group $R_1$ may be an average number representing the average length of the hydrocarbon group in the surfactant mixture. Commercially available non-ionic surfactant or mixtures of non-ionic surfactants include those available from Clariant GmbH under the trade designation GENAPOL such as GENAPOL X-080 and GENAPOL PF 40.

Further suitable non-ionic surfactants that are commercially available include those of the trade designation Tergitol TMN 6, Tergitol TMN 10OX, Tergitol TMN 10, and Triton X-I00 (available from Dow Chemical). According to a further embodiment, a mixture of one or more surfactants according to formula (VII) in which m is 0 with one or more surfactants according to formula (VII) with n and m each being non-zero can be used. An example of such a mixture is a mixture of GENAPOL X-080 and GENAPOL PF40.

Ethoxylated amines and amine oxides may also be used as emulsifiers.

Further non fluorinated, non-ionic surfactants that can be used include alkoxylated acetylenic diols, for example ethoxylated acetylenic diols. The ethoxylated acetylenic diols for use in this embodiment preferably have a HLB between 11 and 16.

Commercially available ethoxylated acetylenic diols that may be used include those available under the trade designation SURFYNOL from Air Products, Allentown, Pa. (for example, SURFYNOL 465). Still further useful non-ionic surfactants include polysiloxane based surfactants such as those available under the trade designation Silwet L77 (Crompton Corp., Middlebury, Conn.) Amine oxides are also considered useful as stabilizing additives to the fluoropolymer dispersions described herein.

Polyelectrolytes, such as polyanionic compounds (for example polyanionic poly acrylates and the like) may also be added to the dispersion in addition or instead of the surfactants described above.

The dispersions resulting from the polymerisation methods described herein generally have small particle sizes. For example the methods provided herewith allow the production of fluoropolymer dispersions containing the fluoropolymers as described above having a number average particle size of not more than 400 nm and typically greater than 20 nm, or 50 nm (number average). More particularly, the methods provided herein allow for the production of fluoropolymer dispersions containing the fluoropolymers as described above having an average particle size (number average) of from about 55 nm to less than about 300 nm, or even up to less than about 250 nm or even up to less than about 200 nm.

The dispersions may be monomodal, bimodal or polymodal with respect to particle size distribution and the polymers may have a core-shell structure for example by using a seed-polymerization as known in the art. The molecular weight distribution of the fluoropolymers can be adapted by methods known in the art such that monomodal, bimodal or multimodal dispersions with respect to the molecular weight distribution of the fluoropolymers may be obtained. Known methods of polymerization also allow for the production of polymers with narrow or broad molecular weight distributions.

The methods described herein are particularly suitable for making fluoropolymers as described above that have an MFI (265/5) of from about 0.01 to about 100 g/10 min or an MFI (372/5) of from about 0.01 to about 100 g/10 min, unless described otherwise, wherein MFI (265/5) means measured at 265° C. using a 5 kg load and MFI (372/5) means measured at 372° C. using a 5 kg load.

Therefore, there are provided aqueous dispersions comprising the polyols described herein and fluoropolymers having small particle sizes—as described above. Particular examples include particles having an average particle size (Z-average) of not more than 400 nm or less than 350 nm, or even less than 250 nm or up to about 199 nm. For example, the fluoropolymers may have an average particle size (Z-average) of from about 20 nm to up to about 198 nm, or from about 5.1 nm up to about 182 nm or the may have an average particle size (Z-average) of from about 55 nm to less than about 300 nm, or even up to less than about 250 nm or even up to less than about 200 nm. Typical fluoropolymers include polymers having an average particle size (Z-average) of not more than 400 nm, or from about 55 nm to less than about 300 nm or less than 250 nm or less than about 200 nm and having an MFI (265/5) of from about 0.01 to about 100 g/10 min or an MFI (372/5) of from about 0.01 to about 100 g/10 min. Typical fluoropolymers include polymers having an average particle size (Z-average) of not more than about 400 nm, or from about 55 nm to less than about 300 nm or less than 250 nm or less than about 200 nm and having an MFI (265/5) of from about 0.01 to about 100 g/10 min or an MFI (372/5) of from about 0.01 to about 100 g/10 min and that have a melting point between about 90° C. to about 327° C., preferably between 100° C. and 310° C., or fluoropolymers that are amorphous. Typically, the fluoropolymers have a particle size of from about 20 to about 500 nm (Z-average). The particle size referred to herein is the longest dimension of the particle, i.e. the diameter in case of spherical or spheroidal particles or a length in case of rod-shaped or elongated particle shapes.

Examples of specific fluoropolymer dispersions include aqueous dispersions comprising
i) one or more polyols surfactants as described herein,
ii) a fluoropolymer comprising repeating units derived from TFE, TFE and VDF or from TFE, VDF and HFP.

Preferably, the fluoropolymer of (ii) has an average particle size of from about 50 nm up to about 201 nm or up to about 300 nm (number average).

The fluoropolymer of (ii) may further have an MFI (265/5) of from about 0.01 to about 100 g/10 min (or an MFI (372/5) of from about 0.01 to about 100 g/min) and the dispersion may have a solid content of from about 10 to about 60% by weight based on the weight of the dispersion.

The dispersions may be free or essentially free of perfluorinated alkanoic acids of the type $F_3C—[(CF_2)_2]_n—Z$ wherein n is an integer of 4 to 16 and Z is a carboxylic acid group. Essentially free means >0 but less than 50 ppm per dispersion.

In particular the fluoropolymers of (ii) above include:
(a) a polymer comprising repeating units derived from vinylidene fluoride and tetrafluoroethylene;
(b) a polymer comprising repeating units derived from vinylidene fluoride and hexafluoropropylene;
(c) a polymer comprising repeating units derived from vinylidene fluoride, tetrafluoroethylene, and hexafluoropropylene;

(d) a polymer comprising repeating units derived from vinylidene fluoride, tetrafluoroethylene, hexafluoropropylene, and a hydrocarbon alpha-olefin having from 2 to 9 carbon atoms;
(e) a polymer comprising repeating units derived from tetrafluoroethylene and a hydrocarbon alpha-olefin having from 2 to 9 carbon atoms;
(f) a copolymer of hexafluoropropylene and a hydrocarbon alpha-olefin having from 2 to 9 carbon atoms;
(g) a polymer comprising repeating units derived from tetrafluoroethylene, hexafluoropropylene, and a hydrocarbon alpha-olefin having from 2 to 9 carbon atoms; and
(h) a polymer comprising repeating units derived from tetrafluoroethylene having a melt flow index (ISO-12086-2) at 372° C. of greater than 0.1 g/10 min at a load of 10 kg or an MFI at 265° C. (MFI 265/5) of from about 0.01 to about 100 g/10 min;
i) VDF homopolymer (which may contain up to 10% wt of other comonomers, in particular HFP and/or CTFE).

The fluoropolymers of (ii) above also include fluoropolymers selected from
(a) a bipolymer of vinylidene fluoride and tetrafluoroethylene;
(b) a bipolymer of vinylidene fluoride and hexafluoropropylene;
(c) a terpolymer of vinylidene fluoride, tetrafluoroethylene, and hexafluoropropylene;
(d) a quadpolymer of vinylidene fluoride, tetrafluoroethylene, hexafluoropropylene, and a hydrocarbon alpha-olefin having from 2 to 9 carbon atoms;
(e) a bipolymer of tetrafluoroethylene and a hydrocarbon alpha-olefin having from 2 to 9 carbon atoms;
(f) a bipolymer of hexafluoropropylene and a hydrocarbon alpha-olefin having from 2 to 9 carbon atoms;
(g) a terpolymer of tetrafluoroethylene, hexafluoropropylene, and a hydrocarbon alpha-olefin having from 2 to 9 carbon atoms; and
(h) a homopolymer of tetrafluoroethylene having a melt flow index (ISO-12086-2) at 372° C. of greater than 0.1 g/10 min at a load of 10 kg,
wherein the term "bipolymer" used in (a), (b), (c) and (d) above, the terms "terpolymer" and "quadpolymer" used in (c), (d) and (g) above and the term "homopolymer" used in (h) above mean that essentially no other monomers have been used in the preparation of the polymer, i.e. that the polymer contains at least 99% by weight of the polymer interpolymerised units of the corresponding monomers.

The aqueous dispersions may have a solid content (polymer content) of from about 9 to about 60% wt. and may further contain one or more anionic surfactants like those described above and/or one or more non-ionic surfactants like those described above.

Preferred anionic surfactants include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof.

Preferred non-ionic surfactants include those according to formula (VI).

The fluoropolymers may be recovered from the dispersions, for example by controlled coagulation, which may be achieved, for example, by applying high shear forces and/or adding coagulation agents, which may include salts, acids, bases and organic solvents that are immiscible with water as known in the art.

The fluoropolymers and the fluoropolymer dispersions obtained by the processes described herein may be used, for example, to laminate, coat and/or impregnate a substrate or a surface. The surface may be an inorganic or organic material. The substrate may be, for example, a fiber, a fabric, a granule or a layer. Suitable substrates include, but are not limited to, fibers, fabrics, granules and layers.

Typically, the substrates include fibers, fabrics, granules and layers containing one or more organic polymers, including, for example, fluoropolymers. The fabrics may be woven or non-woven fabrics. The fibers may be organic or inorganic.

The fluoropolymers and the fluoropolymer dispersions that may be obtained by the processes described above may be used in the preparation of coating compositions, for example coating compositions for coating organic or inorganic substrates, including the substrates described above. Such coating compositions may be aqueous dispersions containing further ingredients such as for example adhesion enhancers or primers. Such coating compositions also include solutions of the fluoropolymers in a suitable organic solvent or a solvent mixture. In particular THV polymers may be soluble in organic solvents and may be used as solutions in a suitable organic solvent (for example methylethyl ketone or methyl isobutyl ketone and the like).

THV polymers may also be used to provide fluoropolymer layers that can be printed with inks. PTFE (i.e. homopolymers of TFE or copolymers of TFE and one or more other fluorinated olefins in amounts of less than 1% wt), typically cannot be printed with inks because of their low surface energy and non-stick properties.

For this purpose the fluoropolymer surface can be coated with THV using a THV solution or dispersion. The coated substrate is then subjected to corona treatment under the exclusion of oxygen, e.g. in a nitrogen gas atmosphere or an atmosphere of nitrogen and vaporised organic solvent such as acetone. The corona treatment may be carried out at energy level of for example, 0.5 to 8 J/cm$^2$. Following the corona treatment the substrate can be printed with an UV-curable ink. Inks are liquids containing a pigment. UV-curable inks are inks that can be cured by UV light. Such inks typically contain cross-linkable olefinic unsaturations, such as for example acrylate groups. UV-curable inks are commercially available, for example from 3M Company, St. Paul, USA. Examples include 3M's 2600 UV ink and 3M's 2500 UV ink and 3M's 2200 UV ink. Preferred polymers for providing ink-printable coatings are the fluoropolymers provided herein, in particular THV polymers. In one embodiment there is provided a layered article containing a layer comprising a fluoropolymer, preferably PTFE, and adjacent thereto or coated onto a layer comprising a THV polymer that contains at a surface opposite to the surface facing the fluoropolymer layer a pattern displaying information of decoration and said pattern being created by a UV ink. Preferably the THV surface containing the pattern is a corona treated surface. More preferably, the THV is a THV prepared by the polymerisation process described above.

The fluoropolymers and fluoropolymer dispersions provided herein may be used to prepare fluoropolymer films or sheets, molded or extruded articles, fluoropolymer containing textiles, garments, outdoor clothing, fluoropolymer layer(s) containing textiles for use in architecture, tents, and the like.

Examples of such articles and methods of preparing them are described in DE 20 2004 020 048 U1, WO03/037623 and US2008/0178993.

The processes described herein may also be used to produce fluoroelastomers, wherein the aqueous dispersions described above may be an intermediary product. Therefore, the fluoropolymers and/or dispersions provided herein may be used to prepare fluoroelastomer compositions and articles comprising one or more layer containing a curable fluoropolymer and articles containing cured fluoroelastomers or at least one layer containing a cured elastomer. Such articles may be injection molded, blow molded, extruded, coextruded, laminated or layered articles. Typical articles include seals, O-rings, gaskets, hoses, containers, tubes and the like. In particular useful are articles, such as containers, hoses and tubes that are used to contain or convey or are exposed to fuels or fuel fumes, such as for example fuel tank, fuel management systems, turbo charger hoses or materials exposed to fuels or fuel fumes in aircraft, water craft, motor vehicles and the like. Other applications are materials used in medical applications, materials used in surface protection, for example in clothing, textiles and textiles or foils used in architectural applications.

Polyols as Agents to Increase Shear Stability:

Fluoropolymer dispersions can be instable and prone to coagulation (irreversible phase separation) when exposed to high frictional or shear forces. In particular in continuous coating processes where the fluoropolymer dispersions are pumped through a coating system or sprayed through nozzles, coagulation leads to blockage and interruption of the process. Inhomogeneous dispersions containing coagulates also provide poor coatings. Fluorinated emulsifiers used in the emulsion polymerisation contribute to the stability of the dispersions. When the fluorinated emulsifiers are absent or their amounts are reduced other surfactants have to be added to the dispersions to compensate for the absence or the reduced amount of the fluorinated emulsifier.

In the past aromatic non-ionic surfactants, typically alkylphenolethoxylates, have been used to stabilize fluoropolymer dispersions. Non aromatic ethoxylates also have been suggested as alternatives, in particular branched alkyl ethoxylates have been reported to be efficient in providing shear stability to fluoropolymer dispersions, as described, for example in WO 2006/086796, WO03/059992, EP 0 818 506 A1 and EP 1 452 571 A1.

It has now been found that polyol surfactants as described herein may also be used to increase the shear stability of fluoropolymer dispersions, in particular of dispersion containing no or low amounts of fluorinated emulsifiers.

The polyols may be added to any fluoropolymer dispersions, for example those prepared with the polyols and described herein but also dispersions of the art or those prepared in the traditional way using fluorinated emulsifiers, such as for example as described in EP 0 030 663 A2 to Kuhls et al, WO 03/059992 to Cavanaugh et al, or EP 1 533 325 A1 to Zipplies et al.

The polyols described herein may be added to raw dispersions or to upconcentrated dispersions. Fluoropolymer dispersions resulting from the polymerisation (so called raw dispersions) typically have a "solid content" (polymer content) of from 10 to 45% (by weight based on the total weight of the dispersion). The fluoropolymer content in the dispersions may be increased by upconcentration, for example using ultrafiltration as described, for example in U.S. Pat. No. 4,369,266 or by thermal decantation (as described for example in U.S. Pat. No. 3,037,953 and EP 818 506 A1) or by electrodecantation. The solid content of upconcentrated dispersions is typically about 50 to about 70% by weight.

In particular the polyols may be added to dispersions that may be or have been treated by anion exchange to remove the fluorinated emulsifiers. Methods of removing the emulsifiers from the dispersions by anion-exchange and addition of non-ionic emulsifiers are disclosed for example in EP 1 155 055 B1, EP 1 193 242 B1 or WO 2006/086793 and by addition of polyelectrolytes are disclosed in WO 2007/142888 or by addition of non-ionic stabilizers such as polyvinylalcohols, polyvinylesters and the like.

Suitable fluoropolymer dispersions are preferably dispersions of fluoropolymers as described above in water, i.e. the dispersions are aqueous dispersions. Therefore, there are provided fluoropolymer dispersions containing water, one or more fluoropolymers and at least one polyol compound as will be described in detail below.

Although any fluoropolymer may be used, preferred polymers include those that contain at least about 15% or at least about, 30% or at least about 51% by mole of TFE. Particular useful are fluoropolymers that are non-melt processable.

The fluoropolymers may be of a core-shell structure or a core-shell-shell structure. In one embodiment the fluoropolymers comprise a core and at least a shell wherein the shell has a lower molecular weight than the core. In particular thermoplastic fluoropolymers and in particular fluoropolymers having an MFI (372/10) of 0.1 g/10 min or less may comprise such a structure.

The fluoropolymers are typically present in the form of particles. The particles may be rod-shaped or of spherical shape. The fluoropolymers may have a small particle or large particle size. "Small particle sizes" (or "small particles") as referred to herein are particles having an average particle size (Z-average) of not more than 400 nm or less than 350 nm, or even less than 250 nm or up to about 199 nm. For example, the fluoropolymers may have an average particle size (Z-average) of from about 20 nm to up to about 198 nm, or from about 51 nm up to about 182 nm or the may have an average particle size (Z-average) of from about 55 nm to less than about 300 nm, or even up to less than about 250 nm or even up to less than about 200 nm. Typical fluoropolymers include polymers having an average particle size (Z-average of not more than 500 nm or not more than 400 nm, or from about 55 nm to less than about 300 nm or less than 250 nm or less than about 200 nm and having an MFI (265/5) of from about 0.01 to about 100 g/10 min or an MFI (372/5) of from about 0.01 to about 100 g/10 min. Typical fluoropolymers include polymers having an average particle size (Z-average of not more than 400 nm, or from about 55 nm to less than about 300 nm or less than 250 nm or less than about 200 nm and having an MFI (265/5) of from about 0.01 to about 100 g/10 min or an MFI (372/5) of from about 0.01 to about 100 g/10 min and that have a melting point between about 90° C. to about 327° C., preferably between 100° C. and 310° C., or fluoropolymers that are amorphous. Typically, the fluoropolymers have a particle size of from about 20 to about 500 nm (Z-average). The particle size referred to herein is the longest dimension of the particle, i.e. the diameter in case of spherical or spheroidal particles or a length in case of rod-shaped or elongated particle shapes.

The fluoropolymers may also have "large particle sizes". "Large particles" or "large particle sizes" as used herein are particle sizes of greater than 500 nm. Large particles may be generated, for example by agglomerating small particles during coagulation or by melt-pelletizing particles. Typically, large particles may be present in solid form, i.e. coagulated and dried polymers.

The average particle sizes can be measured by the methods known in the art, for example, by inelastic light scattering (ISO 13321). This methods is preferably used to measure the particle sizes of the polymers in dispersions. The particle sizes of dried (coagulated) polymers can be determined by electron microscopy.

In a particular embodiment the fluoropolymers are fluoropolymers according to (a) to (m) as described above and have a particle size of from about 20 bis 500 nm (Z-average).

The dispersions may contain fluoropolymers of different particle sizes, i.e. the particle size distribution of the fluoropolymer particles can be bimodal or multi-modal as disclosed in e.g. U.S. Pat. No. 5,576,381, EP 0 990 009 B1 and EP 969 055 A1. Multi-modal fluoropolymer particle dispersions may present advantageous properties in coatings, such as better adhesion to the substrate and denser film formation. For example, the fluoropolymer dispersions may comprise a mixture of first fluoropolymer particles having an average particle size (Z-average) of at least 180 nm in combination with second fluoropolymer particles that have an average particle size (Z-average particle diameter) of less than 180 nm, preferably an average particle size of not more than 0.9 or not more than 0.7 times the average particle size (Z-average) of the first fluoropolymer particles (as disclosed, for example, in U.S. Pat. No. 5,576,381). Bimodal or multi-modal fluoropolymer dispersions can be conveniently obtained by blending the aqueous fluoropolymer dispersion of different fluoropolymer particle sizes together in the desired amounts. The fluoropolymer population may not only be bimodal or multimodal with respect to the particle sizes but may also be bimodal or multimodal with respect to the fluoropolymers or the molecular weight of the fluoropolymers used. For example the first polymer having an average particle size of at least 180 nm may be a non-melt processable fluoropolymer and the second fluoropolymer having an average particles size that is not more than 0.9 or not more than 0.7 times the average particle size of the first polymer may be a non-melt processable or a melt-processable fluoropolymer. Similarly the first and/or second fluoropolymer may be a fluoroelastomer. In particular, dispersions of non-melt processable fluoropolymers may be mixed with aqueous dispersions of other fluoropolymers, in particular melt-processable fluoropolymers. Suitable dispersion of melt-processable fluoropolymers that can be mixed with the non-melt processable fluoropolymer dispersions include dispersions of the following fluoropolymers: copolymers of TFE and a perfluorinated vinyl ether (PFA) and copolymers of TFE and HFP (FEP). Such dispersions may be monomodal, bi-modal or multimodal as disclosed in e.g. EP 990 009 A1.

Preferably the individual dispersions already are free of fluorinated surfactant or contain a reduced amount thereof, such as for example amounts of from about 1 to about 500 ppm (or 2 to 200 ppm) based on the total weight of the dispersion. It is however also possible to reduce the amount of fluorinated surfactant subsequent to mixing the dispersions together. Typically the dispersions are ion-exchanged dispersions, which means they, have been subjected by an anion-exchange process to remove fluorinated emulsifiers or other compounds from the dispersions. Such dispersions typically contain trace amounts of trimethyl amine as a side product from the anion-exchange process. Typically, such dispersions contain from about 0.5 to 50 ppm or from 5 to 50 ppm trimethylamine (based on the weight of the dispersion).

The dispersions preferably have a conductivity of at least 50 μS, typically between 100 μS and 1500 μS. The desired level of conductivity of the dispersion may be adjusted by adding a salt thereto such as for example a simple inorganic salt such as sodium chloride or ammonium chloride, sulfates, sulfonates, phosphates and the like. Also, the level of conductivity may be adjusted by adding an anionic non-fluorinated surfactant to the dispersion as disclosed in WO 03/020836. Adding cationic emulsifiers to the dispersions is also possible, as described for example in WO 2006/069101.

The dispersions may contain other non fluorinated anionic and/or non-ionic emulsifiers, including those described above. Typical amounts are 1 to 12% by weight based on the weight of the dispersion.

Other examples of non-ionic surfactants include polysorbates. Polysorbates include ethoxylated, propoxylated or alkoxylated sorbitans and may further contain linear cyclic or branched alkyl residues, such as for example, fatty alcohol or fatty acid residues. Examples of polysorbates include those according to general structure:

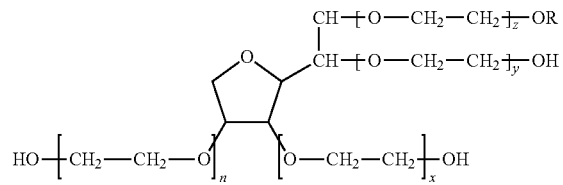

wherein R represents a residue OC—R1 and wherein R1 is a linear, branched, cyclic, saturated or unsaturated, preferably saturated, alkyl, alkoxy or polyoxy alkyl residue comprising 6 to 26, or 8 to 16 carbon atoms. In the above represented formula n, x, y, and z are integers including 0 and n+x+y+z is from 3 to 12. Formula (IX) represents monoesters but di-, tri- or tetraester are also encompassed. In such case one or more of the hydroxyl hydrogens is replaced by a residue R, wherein the residue R has the same meaning as described above for the monoester.

Useful polysorbates include those available under the trade designation Polysorbate 20, Polysorbate 40, Polysorbate 60 and Polysorbate 80. Polysorbate 20, is a laurate ester of sorbitol and its anhydrides having approximately twenty moles of ethylene oxide for each mole of sorbitol and sorbitol anhydrides. Polysorbate 40 is a palmitate ester of sorbitol and its anhydrides having approximately twenty moles of ethylene oxide for each mole of sorbitol and sorbitol anhydrides. Polysorbate 60 is a mixture of stearate and palmitate esters of sorbitol and its anhydrides having approximately twenty moles of ethylene oxide for each mole of sorbitol and sorbitol anhydrides.

Polyelectrolytes, such as polyanionic compounds (for example polyanionic poly acrylates) may also be added to the dispersion in addition or instead of the surfactants described above.

The dispersions may further contain ingredients that may be beneficial when coating or impregnating the dispersion on a substrate, such as adhesion promoters, friction reducing agents, pigments and the like. Optional components include, for example, buffering agents and oxidizing agents as may be required or desired for the various applications. The dispersions of the present invention can be used to produce final coating compositions for coating various substrates such as metals, fluoropolymer layers and fabrics, such as, for example, glass fiber-based fabrics. Such fabrics may be used as architectural fabrics. Generally, the fluoropolymer dispersions will be blended with further components typically used to produce a final coating composition. Such further components may be dissolved or dispersed in an organic solvent such as toluene, xylene and the like. Typical components that are used in a final coating composition include polymers such as polyamide imides, polyimides or polyarylen sulphides or inorganic carbides, such as silicium carbide, and metal oxides. They are typically employed as heat resistant adhesion promoters or primers. Still further ingredients such as pigments and mica particles may be added as well to obtain the final coating composition. The fluoropolymer dispersions typically represent about 10 to 80% by weight of the final composition. Details on coating compositions for metal coatings and components used therein have been described in e.g. WO 02/78862, WO 94/14904, EP 1 016 466 A1, DE 2 714 593 A1, EP 0 329 154 A1, WO 00/44576, and U.S. Pat. No. 3,489,595.

The fluoropolymer dispersions described herein may be used, for example, to laminate, coat and/or impregnate a substrate. The substrate or the treated surface thereof may be an inorganic or organic material. The substrate may be, for example a fiber, a fabric, a granule or a layer. Typical substrates include organic or inorganic fibers, preferably glass fibers, organic or inorganic fabrics, granules (such as polymer beads) and layers containing one or more organic polymers, including, for example, fluoropolymers. The fabrics may be woven or non-woven fabrics. The substrate may also be a metal or an article containing a metal surface.

The fluoropolymer compositions provided herein may be used to prepare fluoropolymer films or sheets, fluoropolymer coated cookware or fluoropolymer coated beads, such as chromatographic resins, molded or extruded articles, fluoropolymer containing textiles, garments, outdoor clothing, fluoropolymer layer(s) containing fabrics for use in architecture, tents, and the like. Examples of such articles and methods of preparing them are described in DE 20 2004 020 048 U1, WO 03/037623 and U.S. Patent Publ. No. 2008/0178993.

Polyol Compounds:

The polyol compounds as used herein above and below are non-aromatic compounds. They contain at least one polyol unit and at least one long chain unit.

The polyol unit comprises at least two or at least three hydroxyl groups. Preferably two, more preferably at least two, hydroxyl groups are adjacent to each other. The polyol unit may be non-cyclic but preferably the polyol unit is cyclic. The polyol compounds may comprise more than one polyol units, which may be identical or different.

The long chain unit may be a linear or a branched residue that contains at least six carbon atoms. The long chain residue typically is a hydrocarbon residue. Preferably the long chain unit is an alkyl chain which may contain no or one or more than one oxygen atoms in the chain (catenary oxygen atoms) and which may be substituted or not substituted. Typical substituents include halogens, alkoxy groups and combinations thereof. The long chain unit typically includes an alkyl, alkoxy or polyoxy alkyl residue containing at least 6 carbon atoms or at least 8 carbon atoms and typically between 6 to 26 or 8 to 16 carbon atoms. The long chain unit is typically saturated. In fact the polyol compound is typically saturated. The polyol compounds may contain a plurality of long chain units, which may be identical or different.

The number of hydroxyl groups, the number of polyol units and the length and/or number long chain units are preferably selected such that the polyol compound is still water soluble at room temperature. Water soluble means that at least 1 g of the compound gets dissolved in 100 ml distilled water at ambient conditions (25° C., 1 bar). Preferably, the polyol compound is a surfactant, i.e. it is surface active and is capable of lowering the surface tension of water. Preferred polyol compounds are those that lower the surface tension of water to less than 35 dyn/cm when present in distilled water at an amount of 1.0% by weight at ambient conditions. This can be measured using surface tensiometer.

The polyol compounds are preferably non-ionic.

Typical examples of polyol compounds include compounds having one or more sugar unit as polyol unit. The sugar unit may have been modified to contain at least one long chain unit as described above. Suitable polyol compounds containing at least one long chain moiety include, for example, alkyl glycosides, modified alkyl glycosides, sugar esters and combinations thereof. The sugars include, but are not limited to, monosaccharides, oligosaccharides and sorbitanes. Monsaccharides include pentoses and hexoses. Typical examples of monosaccharides include ribose, glucose, galactose, mannose, fructose, arabinose, xylose. Oligosaccharides include oligomers of 2 to 10 of the same or different monosaccharides. Examples of oligosaccharides include but are not limited to saccharose, maltose, lactose, raffinose and isomaltose.

Typically, the sugars suitable for use as polyol compounds include cyclic compounds containing a five-membered ring of 4 carbon atoms and one hetero atom (typically an oxygen or sulphur, but preferably an oxygen atom) or cyclic compounds containing a six-membered ring of 5 carbon and one hetero atom as described above, preferably, an oxygen atom. They further contain at least two or at least three hydroxy groups (—OH groups) bound to the carbon ring atoms. Typically, the sugars have been modified in that one or more of the hydrogen atoms of a hydroxy group (and/or hydroxyalkyl group) bound to the carbon ring atoms has been substituted by the long chain residue such that an ether or ester bond is created between the long chain residue and the sugar moiety.

The sugar-based polyols may contain a single sugar unit or multiple sugar units. A single sugar unit or multiple sugar units may be modified with the long chain moieties as described above.

Specific examples of sugar-based polyol compounds include: glycosides, sugar esters, sorbitan esters and mixtures and combinations thereof.

Glycosides represent sugars that contain a non-sugar moiety, here at least one long chain moiety as described above. Specific examples of glycosides include alkyl glycosides (long chain moiety is an alkyl) and modified alkyl glycosides (long chain residue is a modified alkyl).

Glycosides include monoglucosides (i.e. a molecule with a single glucose moiety) diglucosides (i.e. a molecule with two glucose moieties) and poly glucosides (i.e. molecules with two or more glucose moieties). The glycosides may contain only glucose units but may also contain units of other sugars. The sugar moiety may be present as a pyranose (six-membered ring) or as a furanose (five membered ring) or as combinations and mixtures thereof (for example, but not limited to glucopyranosides, glucofuranosides, di-glucopyranosides, di-furanosides, glucopyranoside-glucofuranosides and the like).

Preferably, the glycosides are alkyl glycosides. The alkyl glycosides may contain a single, multiple, identical and different alkyl residues as long chain moieties as described above. The alkyl residues include linear, cyclic or branched, preferably saturated alkyl residues containing at least 6 carbon atoms. Typically, the alkyl residues contain from 6 to 26, or from 8 to 16 carbon atoms.

Modified alkyl glycosides include substituted alkyls residues as long chain moieties, wherein the substituents may be alkoxy groups, halogens, or catenary ether atoms, e.g. the long chain moiety is a (poly)oxyalkly residue.

Suitable alkyl or modified alkyl glycosides can be represented by the general formula

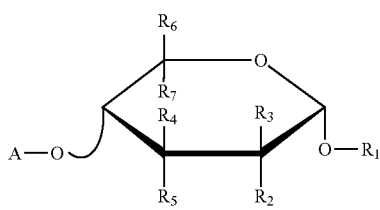

(including enantiomers, stereoisomers and combinations thereof), wherein $R_1$ represents H, an alkyl, alkoxy or polyoxy alkyl residue containing less than 6 carbon atoms or a long chain moiety as described above. $R_2$, $R_3$, $R_4$, $R_5$, $R_6$ and $R_7$ are, independently, either H, OH, OR' or $CH_2R''$ with the proviso that at least two, preferably at least three of $R_2$, $R_3$, $R_4$, $R_5$, $R_6$ and $R_7$ are OH or contain an OH group. R' is a long chain unit as described above. R'' is OH, an alkyl, alkoxy or polyoxy alkyl residue containing less than 6 carbon atoms or a long chain unit as described above. A represents one or more, identical or different cyclic, linear or branched polyhydroxy residues. In the formula above at least one of R1, R' or R'' is a long chain unit as described above.

A preferred type of polyol compounds are alkyl or modified alkyl glucosides. These type of surfactants contains at least one glucose moiety. Examples of alkyl or modified alkyl glucosides include compounds represented by the formula (Including enantiomers and diastereoisomers and combinations thereof):

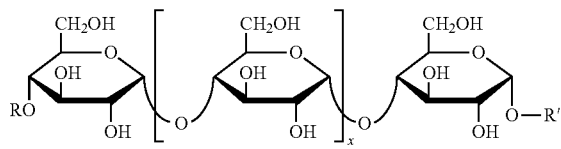

wherein x represents 0, 1, 2, 3, 4 or 5 and n represents an integer of from 8 to 22. R and R' may be identical or different and represent H or a long chain unit as described above, with the proviso that at least one of R and R' are not H. Typical examples for R and R' include fatty alcohol residues. Examples of fatty alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalysed reaction of glucose, starch or n-butyl glucosides with fatty alcohols which typically yields a mixture of various alkyl glucosides (Alkylpolygylcoside, Römpp, Lexikon Chemie, Version 2.0, Stuttgart/New York, Georg Thieme Verlag, 1999). Examples of fatty alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid and combinations thereof.

Alkyl glucosides are also commercially available under the trade designation GLUCOPON or DISPONIL from Cognis GmbH, Düsseldorf, Germany.

Another type of suitable polyol compounds includes compounds according to formula:

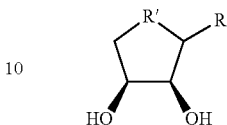

and including enantiomers and diastereoisomers and combinations thereof. In the above formula R' represents a heteroatom, such as S or O, preferably O and R represents the long chain residue as described above.

Sugar Esters:

Sugar esters include mono- di-, tri or tetraester of sugars and carboxylic acids containing from 6 to 26 or 8 to 16 carbon atoms (such as, for example, fatty acids) and include esters of such carboxylic acids and disaccharides, trisaccharides or tetrasaccharides or polysaccharides. Examples of disaccharides include sucrose (a disaccharide of glucose and fructose), lactose, trehalose, maltose, cellobiose, turalose. Examples of trisaccharides include maltotriose, raffinose, melezitose. Fatty acids include, for example, hexanoic acid, octanoic acid, nonanoic acid, decanoic acid, undecanoic acid, dodecanoic acid (lauric acid), tetradecanoic acid (myristinic acid), hexadecanoic acid, heptadecanoic acid, octadecanoic acid, eicosanoic acid and combinations thereof.

A specific type of sugar esters are sorbitan esters. Sorbitan esters include esters, mono-, di- or triesters of sorbitans with long-chain (C6 to C26 or C8 to C16) carboxylic acids, such as for example the fatty acids described above.

Specific examples include compounds according to the structure (including enantiomers and diastereoisomers and mixtures thereof):

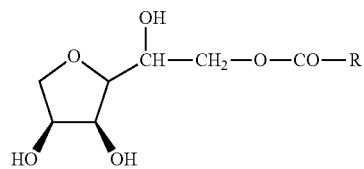

wherein R represents a linear, branched, cyclic, saturated or unsaturated, preferably saturated, alkyl, alkoxy or polyoxy alkyl residue comprising 6 to 26 or 8 to 18 carbon atoms. The sorbitan ester shown in the formula above is a monoester. Di-, tri- or tetraester are also encompassed. In such embodiments the hydrogen atoms of one or more or the cyclic and/or the side chain hydroxy group are substituted by the same or different residues R, wherein R is a long chain residue as described above, preferably a linear, cyclic or branched alkyl residue of 6 to 26 or 8 to 18 carbon atoms.

Sugar esters are commercially available under the trade designation SISTERNA, for example SISTERNA PS750 from Sisterna BV. Netherlands.

It is understood that mixtures of polyol compounds may also be used.

Suitable polyol compounds are capable of increasing the shear stability of a fluoropolymer dispersion when used in effective amounts—as can be determined by subjecting a corresponding dispersion to the shear test described below. To increase the shear stability the polyol compounds are typically used in an amount of about 1 to about 12% based on the amount of polymer in the dispersion to improve the shear stability. If used as emulsifiers in the polymerisation the amount of polyols required to achieve that purpose may be lower as has been indicated above.

The polyol compounds preferably do not interfere in the ion-exchange process for removing fluorinated emulsifiers. They can also be used in upconcentration processes such as, for example, decantation or ultrafiltration.

Advantages and embodiments of this invention are further illustrated by the following exemplified embodiments and examples which should not be construed to limit the invention thereto.

1. A composition comprising.
i) at least one non-aromatic polyol compound containing at least one polyol unit having at least two hydroxyl groups and at least one long chain unit containing at least 6 carbon atoms;
ii) at least one fluoropolymer comprising repeating units derived from a fluorinated olefin.
2. The composition according to any one of the preceding embodiments wherein the polyol unit is cyclic.
3. The composition according to any one of the preceding embodiments wherein the polyol unit contains at least three hydroxyl groups.
4. The composition according to any one of the preceding embodiments wherein the polyol unit contains at least two hydroxyl groups that are in an adjacent position to each other
5. The composition according to any one of the preceding embodiments wherein the long-chain unit is linear or branched
6. The composition according to any one of the preceding embodiments wherein the polyol unit contains at least one sugar
7. The composition according to any one of the preceding embodiments wherein polyol compound comprises at least one sugar unit that has been modified to contain at least one long chain unity containing at least 6 carbon atoms.
8. The composition of any one of the preceding embodiments wherein the polyol compound is selected from alkyl glycosides, modified alkyl glycosides, sorbitan esters and combinations thereof.
9. The composition according to any one of the preceding claims wherein the polyol compound comprises an alkyl glycoside represented by the general formula

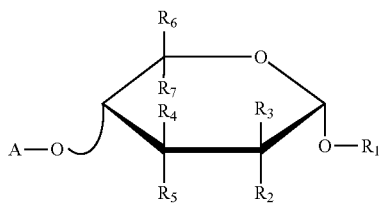

wherein $R_1$ represents an alkyl, alkoxy or polyoxy alkyl residue containing at least 6 carbon atoms, $R_2$, $R_3$, $R_4$, $R_5$, $R_6$ and $R_7$ are independently either H, OH, OR' or $CH_2R''$ with the proviso that at least two, preferably at least three of $R_2$, $R_3$, $R_4$, $R_5$, $R_6$ and $R_7$ are OH, wherein R' is an alkyl, alkoxy or polyoxy alkyl residue containing at least 6 carbon atoms, R" is OH, an alkyl, alkoxy or polyoxy alkyl residue containing at least 6 carbon atoms or a hydroxyl alkyl or alkoxy or polyoxyalkyl, a polyhydroxy alkyl or alkoxy or polyoxyalky residue; A represents one or more, identical or different cyclic, linear or branched polyhydroxy residues.

10. The composition according to any one of the preceding embodiments wherein the polyol compound is an alkyl glucoside represented by the general formula

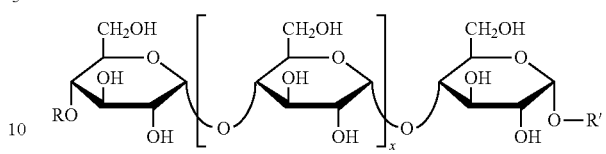

wherein x represents 0, 1, 2, 3, 4 or 5, R and R' independently represent H or a long chain unit containing at least 6 carbon atoms with the proviso that at least one of R and R' is not H.
11. The composition according to anyone of the embodiments 1 to 9 wherein the polyol compound is a sorbitan ester according to the formula:

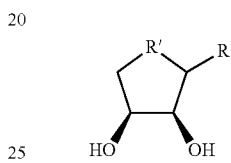

Wherein R' represents a heteroatom selected from O and S, R represents a long chain unit containing at least 6 carbon atoms.
12. The composition according to embodiment 11 wherein the polyol compound is a sorbitan ester according to the formula:

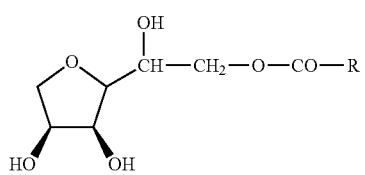

Wherein R represent a long chain unit having at least 6 carbon atoms, preferably a linear, branched, cyclic, saturated or unsaturated, preferably saturated, alkyl, alkoxy or polyoxy alkyl residue comprising 6 to 26 or 8 to 18 carbon atoms.
13. The composition according to any one of the preceding embodiments wherein the composition contains 0 ppm or more than 0 and less than 150 ppm of perfluorinated alkanoic acids of the type $F_3C-[(CF_2)_2]_n-Z$ wherein n is an integer of 5 to 8 and Z is a carboxylic acid group.
14. The composition according to any one of the preceding embodiments contains one or more fluorinated alkoxy or fluorinated polyoxy alkyl acids.
15. The composition according to any one of the preceding embodiments wherein the fluoropolymer has an average particle size (Z-average) of from about 20 to about 500 nm.
16. The composition according to any one of the preceding embodiments wherein the composition is an aqueous dispersion.
17. The composition according to any one of the preceding embodiments wherein the composition is an aqueous composition having a fluoropolymer content (solid content) of from about 10 to about 70% (or from about 30 to about 65%).
18. The composition according to any one of the preceding embodiments further containing one or more anionic surfactants and/or one or more non-ionic surfactants.

19. The composition according to any one of the preceding embodiments further containing from 1 to 100 ppm of trimethylamine.

20. The composition according to any one of the preceding embodiments containing from about 1 to 20% weight based on the weight of the composition of the polyol compound.

21. The composition according to any one of the preceding embodiments that contains no or less than 100 ppm of aromatic surfactants.

22. The composition according to any one of the preceding embodiments further containing at least one anionic surfactant, preferably an alkyl sulphate.

23. The composition according to any one of the proceeding embodiments wherein the fluoropolymer contains a core and at least one shell wherein the shell has a lower molecular weight than the core.

24. The composition according to any one of the preceding embodiments wherein the fluoropolymer is selected from:

(a) a polymer comprising repeating units derived from vinylidene fluoride and tetrafluoroethylene;

(b) a polymer comprising repeating units derived from vinylidene fluoride and hexafluoropropylene;

(c) a polymer comprising repeating units derived from vinylidene fluoride, tetrafluoroethylene, and hexafluoropropylene;

(d) a polymer comprising repeating units derived from vinylidene fluoride, tetrafluoroethylene, hexafluoropropylene, and a hydrocarbon alpha-olefin having from 2 to 9 carbon atoms;

(e) a polymer comprising repeating units derived from tetrafluoroethylene and a hydrocarbon alpha-olefin having from 2 to 9 carbon atoms;

(f) a copolymer of hexafluoropropylene and a hydrocarbon alpha-olefin having from 2 to 9 carbon atoms;

(g) a polymer comprising repeating units derived from tetrafluoroethylene, hexafluoropropylene, and a hydrocarbon alpha-olefin having from 2 to 9 carbon atoms;

(h) a polymer comprising repeating units derived from tetrafluoroethylene having a melt flow index at 372° C. of greater than 0.1 g/10 min at a load of 10 kg;

(i) a polymer comprising repeating units derived from tetrafluoroethylene having a melt flow index at 372° C. of 0.1 g/10 min or less than 0.1 g/10 min and (j) PVDF;

(k) a polymer comprising repeating units derived from TFE and one or more perfluoroalkyl vinyl ether and/or perfluoroalkyl ally ether and optionally hexafluoropropylene;

(l) a polymer comprising repeating units derived from TFE, hexafluoropropylene and, optionally, one or more perfluoroalkyl vinyl ether and/or perfluoroalkyl ally ether; and (m) a polymer comprising repeating units derived from TFE, hexafluoropropylene, ethylene and/or propylene and, optionally, one or more perfluoroalkyl vinyl ether and/or perfluoroalkyl ally ether.

25. The composition according to any one of the preceding embodiments wherein the fluoropolymer has a melt flow index at a load of 10 kg at 372° C. (MFI 372/10) of from 0 g/10 min to 0.1 g/10 min or wherein the fluoropolymer has an MFI (372/10) of more than 0.1 g/10 min.

26. The composition according to any one of the preceding embodiments wherein the fluoropolymer is selected from tetrafluoroethylene homopolymers or tetrafluoroethylene copolymers containing up to 1% by weight of comonomers.

27. The composition according to any one of the preceding embodiments wherein the fluoropolymer has a melting point between about 312° C. and about 350° C.

28. A substrate containing a coating prepared from the composition according to any one of embodiments 1 to 27.

29. The substrate of embodiment 28 being selected from cookware, bearings, fibers and fabrics.

30. Method of increasing the shear stability of a fluoropolymer dispersion comprising adding to the dispersion an effective amount of at least one polyol compound of embodiments 1 to 12.

31. The method according to embodiment 30 wherein the dispersion contains a fluoropolymer as defined in embodiments 23 to 27.

32. Method of coating or impregnating a substrate comprising providing a fluoropolymer composition according to any one of embodiments 1 to 27, optionally adding further components and applying the composition to a substrate.

33. The composition according to embodiments 1 to 27 being a coating composition further containing one or more of the following: a metal oxide, a metal cabide, at least one non-fluorinated polymer or a combination thereof.

34. A method of preparing an aqueous dispersion containing a fluoropolymer comprising repeating units derived from one or more fluorinated olefins, said method comprising polymerizing the fluorinated olefins in an aqueous phase in the presence of a non-aromatic polyol containing at least one polyol unit having at least two hydroxyl groups and at least one long chain unit containing at least 6 carbon atoms.

35. The method of embodiment 34 wherein the fluorinated olefins comprise one or more of the following fluorinated olefins: tetrafluoroethylene (TFE), vinylidenefluoride (VDF), hexafluoropropylene (HFP) or a combination thereof, in particular a combination comprising TFE and VDF, a combination comprising TFE and HFP or a combination comprising TFE, VDF and HFP.

36. The method of 34. or 35. wherein the polyol is as defined in embodiments 1 to 12.

37. The method according to any one of 34. to 36. wherein the polyol comprises an alkyl polyglycoside represented by the general formula,

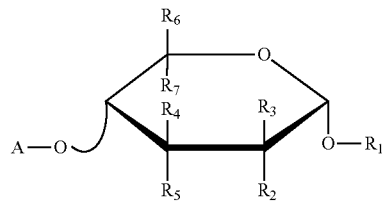

wherein $R_1$ represents an alkyl, alkoxy or polyoxy alkyl residue containing at least 6 carbon atoms, $R_2$, $R_3$, $R_4$, $R_5$, $R_6$ and $R_7$ are independently either H, OH, OR' or $CH_2R''$ with the proviso that at least one, preferably at least two of $R_2$, $R_3$, $R_4$, $R_5$, $R_6$ and $R_7$ are OH, wherein R' is an alkyl, alkoxy or polyoxy alkyl residue, R" is OH, an alkyl, alkoxy or polyoxy alkyl or a hydroxyl alkyl or alkoxy or polyoxyalkyl, a polyhydroxy alkyl or alkoxy or polyoxyalky residue; A represents one or more, similar or different cyclic, linear or branched polyhydroxy residues.

38. The method according to 34. to 37. wherein the polyol is an alkyl(poly)glucoside represented by the general formula

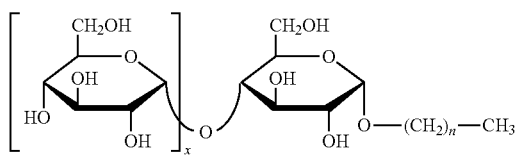

wherein x represents 0, 1, 2, 3, 4 or 5 and n represents an integer of from 8 to 22. In case where x is 0, the ether oxygen contains a hydrogen and forms an hydroxyl group.

39. The method according to 34. to 37. wherein the polyol comprises a sorbitan ester.

40. The method according to 34. to 39. wherein the polymerizing takes place in an aqueous medium that is free of perfluorinated alkanoic acids of the type $F_3C—[(CF_2)]_n—Z$ wherein n is an integer of 4 to 16 and Z is a carboxylic acid group or contains the perfluorinated alkanoic acids in an amount of greater 0 and less than 100 ppm.

41. The method according to 34. to 40. wherein the polyol is present in an amount of from 0.0001 to 1.0 weight percent based on the weight of the aqueous phase.

42. The method according to 34. to 41. wherein the fluorinated olefins are selected so as to produce a polymer selected from:
(i) a polymer comprising repeating units derived from vinylidene fluoride and tetrafluoroethylene;
(ii) a polymer comprising repeating units derived from vinylidene fluoride and hexafluoropropylene;
(iii) a polymer comprising repeating units derived from vinylidene fluoride, tetrafluoroethylene, and hexafluoropropylene;
(iv) a polymer comprising repeating units derived from vinylidene fluoride, tetrafluoroethylene, hexafluoropropylene, and a hydrocarbon alpha-olefin having from 2 to 9 carbon atoms;
(v) a polymer comprising repeating units derived from tetrafluoroethylene and a hydrocarbon alpha-olefin having from 2 to 9 carbon atoms;
(vi) a copolymer of hexafluoropropylene and a hydrocarbon alpha-olefin having from 2 to 9 carbon atoms;
(vii) a polymer comprising repeating units derived from tetrafluoroethylene, hexafluoropropylene, and a hydrocarbon alpha-olefin having from 2 to 9 carbon atoms; and
(viii) a polymer comprising repeating units derived from tetrafluoroethylene having a melt flow index (ISO-12086-2) at 372° C. of greater than 0.1 g/10 min at a load of 10 kg.

43. The method according to 34 to 42 wherein the fluoropolymer has an average particle size (number average) of from about 20 to about 350 nm or from about 50 to about 200 nm 44. The method according 34 to 43 wherein the fluoropolymer comprises one or more repeating units derived from tetrafluoroethylene, hexafluoropropylene and vinylidene-fluoride.

45. The method according to 34 to 44 wherein the fluoropolymer is curable.

46. The method according to any one of 34 to 45 wherein the fluoropolymer has an average particle size (Z-average) of from about 20 to about 350 nm, preferably from about 30 to about 250 nm, more preferably from about 50 up to about 210 nm.

47. The method according to 34 to 46 wherein the fluoropolymer has an MFI (265/5) of from about 0.01 to about 100 g/10 min or an MFI (372/5) of from about 0.01 to about 100 g/10 min.

48. The method according to any one of 34 to 47 wherein the fluoropolymer melts between 100° C. and 310° C.

49. A composition comprising
i) one or more polyol as defined in embodiments 1 to 12
ii) one or more fluoropolymers containing repeating units derived from monomers selected from TFE, VDF, HFP or a combination thereof.

50. The composition according to 49 wherein the composition is free of perfluorinated alkanoic acids of the type $F_3C—[(CF_2)]_n—Z$ wherein n is an integer of 4 to 16 and Z is a carboxylic acid group or contains the perfluorinated alkanoic acids in an amount of greater 0 and less than 100 ppm.

51. The composition according to any one of 49 or 50 wherein the monomers are selected to produce a fluoropolymer selected from:
(i) a polymer comprising repeating units derived from vinylidene fluoride and tetrafluoroethylene;
(ii) a polymer comprising repeating units derived from vinylidene fluoride and hexafluoropropylene;
(iii) a polymer comprising repeating units derived from vinylidene fluoride, tetrafluoroethylene, and hexafluoropropylene;
(iv) a polymer comprising repeating units derived from vinylidene fluoride, tetrafluoroethylene, hexafluoropropylene, and a hydrocarbon alpha-olefin having from 2 to 9 carbon atoms;
(v) a polymer comprising repeating units derived from tetrafluoroethylene and a hydrocarbon alpha-olefin having from 2 to 9 carbon atoms;
(vi) a copolymer of hexafluoropropylene and a hydrocarbon alpha-olefin having from 2 to 9 carbon atoms;
(vii) a polymer comprising repeating units derived from tetrafluoroethylene, hexafluoropropylene, and a hydrocarbon alpha-olefin having from 2 to 9 carbon atoms; and
(viii) a polymer comprising repeating units derived from tetrafluoroethylene having a melt flow index (ISO-12086-2) at 372° C. of greater than 0.1 g/10 min at a load of 10 kg.

52. The composition according to any one of 49 to 51 wherein the composition is an aqueous dispersion.

53. The composition according to any one of 49 to 52 wherein the composition is an aqueous composition having a fluoropolymer content (solid content) of from about 20 to about 60% wt. and further containing one or more anionic surfactants and/or one or more non-ionic surfactants.

54. The composition according to any one of 49 to 53 wherein the fluoropolymer is curable.

55. An article prepared from the composition according to 49 to 54.

56. An article containing a fluoropolymer obtained by the method according to 34 to 48.

57. The article according to 55 or 56, wherein the article is selected from organic or inorganic fibers, organic or inorganic non-woven or woven fabrics.

58. The article according to 55 or 56, wherein the article is selected from hoses, seals, O-rings, gaskets, laminates or layered articles containing at least one layer containing an organic polymer.

59. Use of a composition according to 49 to 54 for coating or impregnating a fabric, a fiber or a layer containing one or more organic polymers.

60. Method of creating a pattern displaying information or decoration on a fluoropolymer surface comprising:
(a) providing an article having a fluoropolymer surface containing polytetrafluoroethylene or a copolymer of TFE and another olefin, wherein the other olefin is present in amounts of up to 1% wt based on the weight of the polymer, coated with a THV polymer to provide a THV surface having a surface adjacent to the fluoropolymer surface and a surface opposite thereto, and wherein at least the THV polymer coating has been subjected to corona-treatment,
(b) adding a curable ink to the THV coating to creating a pattern displaying information or decoration; and
(c) curing the ink.

62. The method of 61 wherein the curable ink is a UV curable ink.

63. The method of 61 or 62 wherein the corona-treatment was carried out in a nitrogen gas atmosphere or a noble gas atmosphere or a combination thereof.

64. Method of creating an ink-printable fluoropolymer surface comprising:
(a) providing a fluoropolymer surface containing polytetrafluoroethylene or a copolymer of TFE and another olefin, wherein the other olefin is present in amounts of up to 1% wt based on the weight of the polymer,
(b) coating the surface with a THV polymer,
(c) subjecting the THV polymer to corona treatment, preferably under a nitrogen or noble gas atmosphere,
(d) applying a curable ink, preferably a UV curable ink to the THV polymer to create a pattern displaying information or decoration, and
(e) curing the curable ink.

65. An article having a surface containing a polytetrafluoroethylene or a copolymer of TFE and another olefin, wherein the other olefin is present in amounts of up to 1% wt based on the weight of the polymer, wherein the surface is coated with a THV polymer,
wherein the THV coating has been corona-treated and contains a pattern displaying information or decoration by a cured ink.

Methods

Solid content can be determined gravimetrically according to ISO 120866.

Melt flow index (MFI) can be determined at 372° C. (10 kg load) (MFI 372/10), at 372° C. (5 kg load) (MFI 372/5) or at 265° C. (5 kg load) (MFI 265/5) according to DIN EN ISO 1133.

Particle sizes can be determined via inelastic light scattering using a Malvern HAS Zetasizer according to ISO 13321. The average particle sizes are expressed as the Z-average. The Z-average can be converted into the number average if desired.

Melting points can be determined by differential scanning calorimetry (DSC) according to ASTM D 4591.

Determination of Perfluoroalkanoic Acid Content:

The content of perfluoroalkanoic acids can be determined via gas chromatography of the methyl ester using an internal standard, e.g. the methyl ester of perfluoro decanoic acid. To quantitatively convert the acid to the methyl ester, 200 µl dispersion are treated with 2 ml methanol and 1 ml acetylchloride in presence of 0.3 g MgSO4 for 1 hour at 100° C. The formed methyl ester can be extracted with 2 ml hexane and subjected to gaschromatography analysis. The detection limit is <5 ppm.

Conductivity:

Conductivity can be measured with the 712 Conductometer, supplied by Metrohm AG, Germany.

Surface Tension:

Surface tension can be measured with the Krüss Tensiometer T9, supplied by Krüss GmbH, Germany, for example by the Wilhelmy method using a platinum plate.

EXAMPLES

To 1,000 g of a PTFE dispersion prepared according to example 4 [0079] of EP 1 533 325 A1 12.5 g of the non-ionic surfactant indicated in table 1 were added under gentle stirring. 0.25 g of EDENOR C-12 were then added to the dispersions. 50 ml of AMBERLITE IRA 402-OH ion exchange resin (in OH form) were added and the mixture was rolled over night. The ion exchange resin was removed by passing the mixture over a 50 µm sieve. The dispersion were upconcentrated to a solid content of 58% by evaporation (the emulsifier content was then 5.5% based on solid content). 150 g of the dispersions were then thermostated to 20° C. and put in a 250 ml standard glass beaker of an inner diameter of 65 mm. The agitation head (S 25 N-25 G) of an Ultra Turrax T25, supplied by Janke & Kunkel, was immersed in the center of the beaker such that the end of the head was 7 mm above the beaker bottom. The Ultra Turrax was switched on at a revolution speed of 8000 rpm. Agitation rendered the surface of the dispersion "turbulent" or "wavy". After 10 to 20 sec, 2.0 g xylene were added dropwise within less than 10 sec to the agitated dispersion. Time measurement started with the addition of xylene and was stopped when the surface of the agitated dispersion no longer showed visible turbulence. The surface "freezes" or smoothes due to coagulation. Coagulation was accompanied by a characteristic change of sound of the Ultra Turrax. In case that the "surface freezing" could not be clearly observed due to foam formation the time measurement was stopped with the onset of the change of sound. Reported shear stability values are indicated in table 1 and are the average of 5 measurements.

TABLE 1

| | Surfactant (supplier) | Chemical type | Shear time (minutes:seconds) |
|---|---|---|---|
| Comparative Example 1 | LUTENSOL M7 (BASF) | C10/C18 PEG, 7 ethoxy units | 0:48 |
| Comparative Example 2 | LUTENSOL T08 (BASF) | PEG-8 C13 oxoalcohol | 2:05 |
| Comparative Example 3 | LUTENSOL T010 (BASF) | PEG-15 C13 oxoalcohol | 2:35 |
| Comparative Example 4 | GENAPOL X090 (Clariant) | Ethoxylated isotridecanol (7 ethoxlyene units) | 3:37 |
| Comparative Example 5 | TRITON X100 (Dow Chemical Company) | Alkylpolyglycolether (8 ethoxy units) | 18:03 |
| Comparative Example 6 | TERGITOL TMN 100-X (Dow Chemical Company) | Branched alkyl ethoxylates | 9:12 |
| Comparative Example 7 | EMULSOGEN LCN 088 (Clariant) | Alkylpolyglycol ether | 4:58 |
| Example 1 | DISPONIL APG 425 (Cognis) | Alkylgluccoside | >20:00 |
| Comparative Example 8 | SURFINOL 465 (Air products) | Acetylene diol | 0:05 |

Polymerisations with Polyols

Comparative Example 1

Polymerization with a Carbosilane Surfactant 30 liters deionized water containing 2 g of a carbosilane surfactant (polyethylene glycole-monomethyl-mono-(bistrimethylsilylmethyl-methyl-prop-3-yl)ether (prepared according to WO 2008/033271) were fed in a 50 liter polymerization kettle together with 200 g NaOH and 40 mg CuSO$_4$×5H$_2$O. Air was removed by alternating evacuation and pressurizing with nitrogen up to 4 bar. Then the kettle was pressurized with 6.1 bar HFP. 5.2 bar VDF, 2.9 bar TFE and 1.3 bar ethane. The total pressure was 15.5 bar abs. The temperature in the vessel was adjusted to 70° C. The polymerization was initiated by pumping in the vessel an aqueous solution containing 36 g APS (ammonium peroxodisulfate) dissolved in 100 ml deionized water and a solution of 6 g Na$_2$S$_2$O$_5$ in 50 ml deionized water. The speed of agitation was 240 rpm.

The polymerization temperature and pressure were kept constant by feeding TFE, HFP and VDF in a constant weight ratio of 1:0.443:0.855). When 5.5 kg TFE were consumed, polymerization was stopped by closing the monomer-feeding and lowering the speed of agitation. The vessel was vented and the resulting dispersion discharged. The thus obtained dispersion had a solid content of 29.4% and an average particle size of about 246 nm.

Comparative Example 2

Polymerization without a Surfactant 28 liters deionized water containing 12 g ammoniumoxalate and 2 g oxalic acid were fed in a 50 liter polymerization vessel. Air was removed by alternating evacuation and pressurizing with nitrogen up to 4 bar. Then the vessel was presurized with 8.6 bar HFP, 1.9 bar VDF, 4.2 bar TFE and 0.8 bar ethane. The temperature in the vessel was adjusted to 60° C. Polymerization was initiated by continuously pumping in the vessel an aqueous solution containing 5 g KMnO$_4$ dissolved in 1000 ml deionized water. The polymerization was started by quickly pumping 111 ml in the vessel, then the pumping rate was lowered to 2.5 ml/min. The speed of agitation was 240 rpm. Polymerization temperature and pressure were kept constant by feeding TFE, HFP and VDF in a constant weight ratio of 1:0.412:0.488. When 2.5 kg TFE were consumed, polymerization was stopped by closing the monomer-feeding and lowering the speed of agitation. The vessel was vented and the resulting dispersion discharged. The thus obtained dispersion had a solid content of 13% and a particle size of about 387 nm.

Example 2

30 liters deionized water containing 2 g of a sugar-based surfactant (GLUCOPON 600 CS UP an alkyl polyglucoside based on natural fatty alcohols (C10 to C16) from Cognis AG, Dusseldorf, Germany) were fed in a 50 liter polymerization kettle together with 200 g NaOH (10% wt. aq. solution) and 37 mg CuSO$_4$×5H$_2$O and 7.5 g NH$_4$OH (25% wt. aq. solution). Air was removed by alternating evacuation and pressurizing with nitrogen up to 3 bar. Then the kettle was presurized with 8.6 bar HFP. 1.9 bar VDF, 4.5 bar TFE and 0.5 bar ethane. The total pressure was 15.5 bar abs. The temperature in the vessel was adjusted to 70° C. The polymerization was initiated by pumping in the vessel an aqueous solution containing 72 g APS (ammonium peroxodisulfate) dissolved in 200 ml deionized water and a solution of 30 g Na$_2$S$_2$O$_5$ in 100 ml deionized water.

The speed of agitation was 240 rpm. The polymerization temperature and pressure were kept constant by feeding TFE, HFP and VDF in a constant weight ratio of 1:0.412:0.488. When 5.5 kg TFE were consumed, polymerization was stopped by closing the monomer-feeding and lowering the speed of agitation. The vessel was vented and the resulting dispersion discharged. The thus obtained dispersion had a solid content of 26.0% and an average particle size of about 203 nm. The MFI (372/5) of the polymer was 73 g/10 min. The polymer had a melting point (measured by DSC) of 139° C.

Example 3 was repeated but using 8 g of an aqueous solution of 50% by weight of GLUCOPON 600 CSUP. Example 3 was repeated by replacing GLUCOPON 600 CSUP with DISPONIL APG 600 (C12-C14 alkylpolyglycosid from Cognis GmbH, Germany (example 4), and SISTERNA PS 750 (sucrose ester from Sisterna BV, Rosendaal, NL) (example 5).

Fluoropolymer dispersions were obtained having the following properties:

| Example | Running time | Particle size (Z-average) | Melting point | MFI (265/5) |
| --- | --- | --- | --- | --- |
| 3 | 4 h, 10 min | 128 nm | 138° C. | 84 |
| 4 | 4 h, 16 min | 119 nm | 139° C. | 58 |
| 5 | 4 h 21 min | 250 nm | 138° C. | 52 |

All dispersions had a solid content of 26%.

The invention claimed is:

1. A composition comprising
   i) at least one non-aromatic polyol compound containing at least one polyol unit having at least two hydroxyl groups and at least one long chain unit containing at least 6 carbon atoms;
   ii) at least one fluoropolymer comprising repeating units derived from a fluorinated olefin, wherein the fluoropolymer is selected from:
   (a) a polymer comprising repeating units derived from vinylidene fluoride and tetrafluoroethylene;
   (b) a polymer comprising repeating units derived from vinylidene fluoride and hexafluoropropylene;
   (c) a polymer comprising repeating units derived from vinylidene fluoride, tetrafluoroethylene, and hexafluoropropylene;
   (d) a polymer comprising repeating units derived from vinylidene fluoride, tetrafluoroethylene, hexafluoropropylene, and a hydrocarbon alpha-olefin having from 2 to 9 carbon atoms;
   (e) a polymer comprising repeating units derived from tetrafluoroethylene and a hydrocarbon alpha-olefin having from 2 to 9 carbon atoms;
   (f) a copolymer of hexafluoropropylene and a hydrocarbon alpha-olefin having from 2 to 9 carbon atoms;
   (g) a polymer comprising repeating units derived from tetrafluoroethylene, hexafluoropropylene, and a hydrocarbon alpha-olefin having from 2 to 9 carbon atoms;
   (h) a polymer comprising repeating units derived from tetrafluoroethylene having a melt flow index at 372° C. of greater than 0.1 g/10 min at a load of 10 kg;
   (hh) a polymer comprising repeating units derived from tetrafluoroethylene having a melt flow index at 372° C. of 0.1 g/10 min or less at a load of 10 kg;
   (j) polyvinylidenefluoride;
   (k) a polymer comprising repeating units derived from tetrafluoroethylene and repeating units selected from (i) one or more perfluoroalkyl vinyl ether; (ii) one or more perfluoroalkyl ally ether; and (iii) a combination of (i) and (ii), and optionally further comprising repeating units derived from hexafluoropropylene;
   (l) a polymer comprising repeating units derived from tetrafluoroethylene, hexafluoropropylene and, optionally, further comprising repeating units selected from (iv) one or more perfluoroalkyl vinyl ether; (v) one or more perfluoroalkyl ally ether; and (vi) a combination of (iv) and (v); and (m) a polymer comprising repeating units derived from tetrafluoroethylene, hexafluoropropylene, further comprising repeating units selected from (vii) ethylene; (viii) propylene; and (ix) a combination of (vii) and (viii), optionally, further comprising repeating units selected from (x) one or more perfluoroalkyl vinyl ether; (xi) one or more perfluoroalkyl ally ether; and (xii) a combination of (x) and (xi).

2. The composition according to claim 1 wherein the polyol unit is cyclic.

3. The composition according to claim 1 wherein the polyol compound comprises at least one sugar unit that has been modified to contain at least one long chain unity containing at least 6 carbon atoms.

4. The composition according to claim 1 wherein the polyol compound is selected from alkyl glycosides, modified alkyl glycosides, sorbitan esters and combinations thereof.

5. The composition according to claim 1 wherein the polyol compound is an alkyl glucoside represented by the general formula

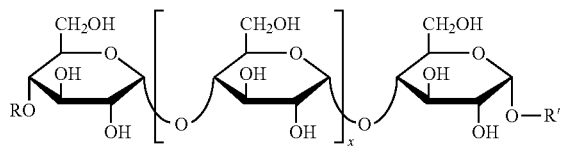

wherein x represents 0, 1, 2, 3, 4 or 5, R and R' independently represent H or a long chain unit containing at least 6 carbon atoms with the proviso that at least one of R and R' is not H.

6. The composition according to claim 1 wherein the polyol compound is according to the formula:

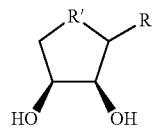

wherein R' represents a heteroatom selected from O and S, R represents a long chain unit containing at least 6 carbon atoms.

7. The composition according to claim 1 wherein the composition contains from 0 ppm to less than 150 ppm of perfluorinated alkanoic acids of the type $F_3C-[(CF)_2]_n-Z$ wherein n is an integer of 5 to 8 and Z is a carboxylic acid group.

8. The composition according to claim 1 wherein the composition is an aqueous dispersion.

9. The composition according to claim 1 further containing from 1 to 100 ppm of trimethylamine.

10. A substrate containing a coating prepared from the composition according to claim 1.

11. A method of coating or impregnating a substrate comprising providing the composition according to claim 1 and a substrate, and applying the composition to the substrate.

* * * * *